United States Patent
Lapelosa et al.

(10) Patent No.: US 9,475,144 B2
(45) Date of Patent: Oct. 25, 2016

(54) MACHINE FOR THE ELECTRO-MARKING OF LARGE METALLIC SURFACES AND RELATIVE PROCESS

(71) Applicant: METALY S.R.L., Formigine (IT)

(72) Inventors: Michele Lapelosa, Bolognese (IT); Stefano Muratori, Formigine (IT)

(73) Assignee: METALY S.R.L., Formigine (MO) (IT)

( * ) Notice: Subject to any disclaimer, the term of this patent is extended or adjusted under 35 U.S.C. 154(b) by 191 days.

(21) Appl. No.: 14/375,368

(22) PCT Filed: Jan. 30, 2013

(86) PCT No.: PCT/IT2013/000029
§ 371 (c)(1),
(2) Date: Jul. 29, 2014

(87) PCT Pub. No.: WO2013/114417
PCT Pub. Date: Aug. 8, 2013

(65) Prior Publication Data
US 2015/0014173 A1    Jan. 15, 2015

(30) Foreign Application Priority Data

Jan. 30, 2012   (IT) .............................. MO2012A0020

(51) Int. Cl.
| | | |
|---|---|---|
| C25F 3/02 | (2006.01) | |
| C25D 17/14 | (2006.01) | |
| B23H 9/06 | (2006.01) | |
| C25D 5/02 | (2006.01) | |
| C25D 7/06 | (2006.01) | |
| C25F 7/00 | (2006.01) | |

(52) U.S. Cl.
CPC .................. *B23H 9/06* (2013.01); *C25D 5/022* (2013.01); *C25D 7/0678* (2013.01); *C25D 17/14* (2013.01); *C25F 3/02* (2013.01); *C25F 7/00* (2013.01)

(58) Field of Classification Search
CPC ............ C25F 3/02; C25D 17/14; B23H 9/06
USPC .......................................................... 205/52
See application file for complete search history.

(56) References Cited

U.S. PATENT DOCUMENTS

| | | |
|---|---|---|
| 2,540,602 A | 2/1951 | Thomas et al. |
| 3,450,606 A | 6/1969 | Darrow |
| 7,799,200 B1 * | 9/2010 | Mayer ...................... B23H 5/08 205/123 |

FOREIGN PATENT DOCUMENTS

| | | |
|---|---|---|
| DE | 103 44 424 A1 | 5/2005 |
| JP | 52-90438 | 7/1977 |

OTHER PUBLICATIONS

International Search Report in PCT/IT2013/000029 dated Apr. 12, 2013 (English Translation Thereof).

(Continued)

*Primary Examiner* — Nicholas A Smith
(74) *Attorney, Agent, or Firm* — McGinn IP Law Group, PLLC

(57) ABSTRACT

A machine for the electrochemical marking treatment of metallic surfaces, includes an electrode placed in sliding movement on the metallic surface to be treated, a buffer impregnated with etching solution for the specific metal in treatment, and an electric current circuit, suitable for electro-marking treatment of said metal, with a conductor connected to the electrode and the other conductor connected to the metallic surface in treatment; and presents to treat large metallic surfaces on plates, metal canvas or on metallic sheet in coil. The plate, canvas or the metallic sheet is placed in a electro-marking mechanism in a reciprocally movable way with respect to the electrode, in such a way to allow the electrode the electrochemical marking action on the surface to be treated even if the electrode is of limited size with respect to said surface, the electrode being movable in the and/or with the electro-marking mechanism, the buffer being impregnated with the etching solution at regular intervals, and the relative motion of the electrode on the surface being the combination of two longitudinal and transverse relative motions.

15 Claims, 17 Drawing Sheets

(56) References Cited

OTHER PUBLICATIONS

International Preliminary Report in PCT/IT2013/000029 dated Mar. 13, 2014 (English Translation Thereof).

Schmid, "Selektive Robotergefuehrte Beschichtung" vol. 99, No. 8, Aug. 1, 2008, pp. 1904-1906 XP001519693, ISSN: 0016-4232.
International Search Report in PCT/IT2013/000029 dated Apr. 12, 2013 (English Translation Thereof) (Prey. Submitted).

* cited by examiner

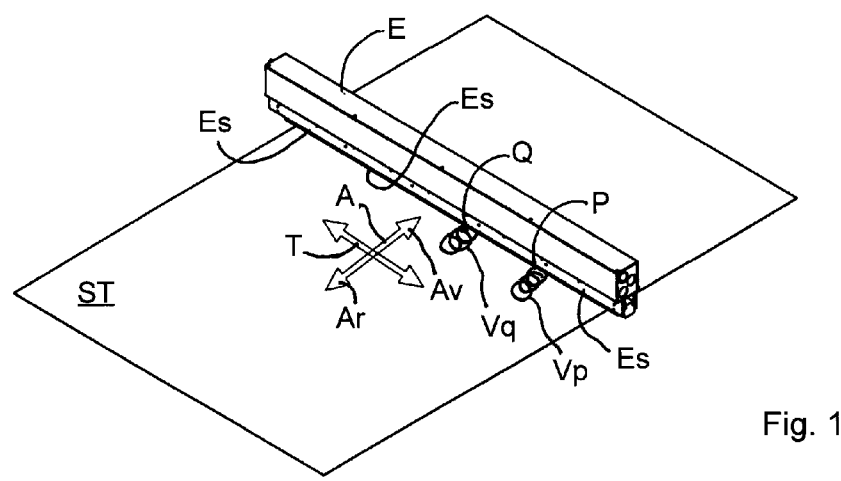
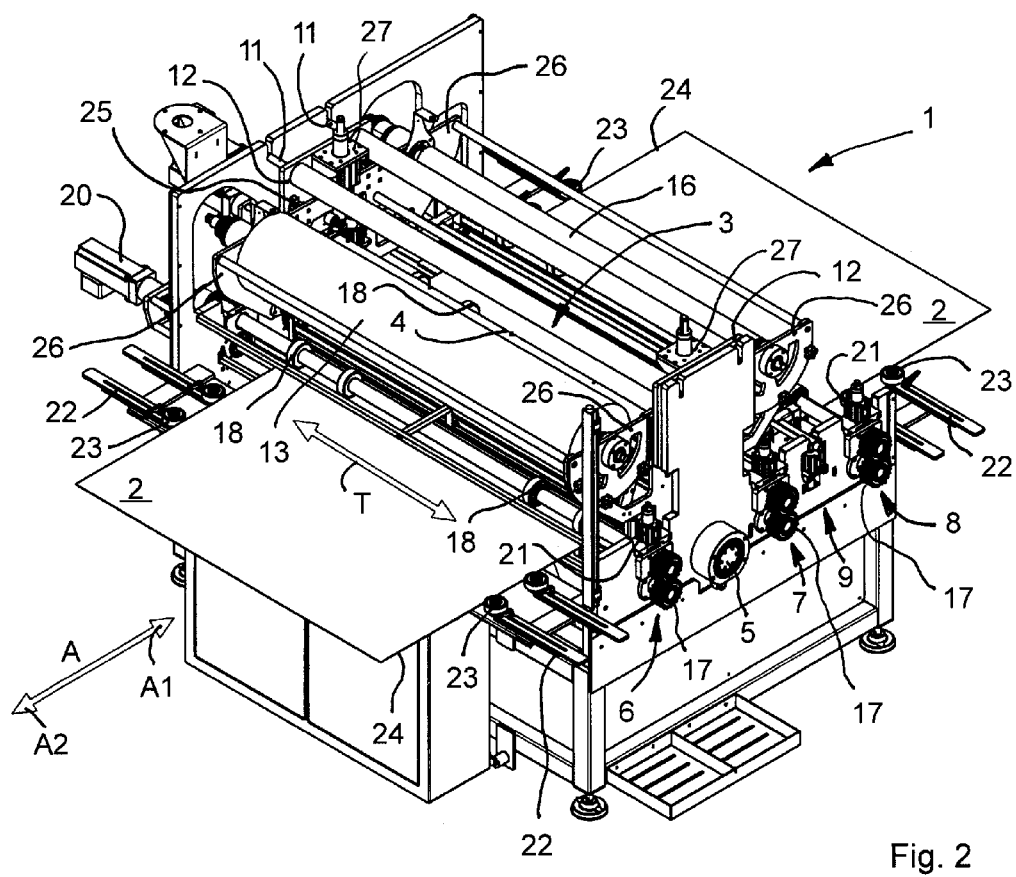

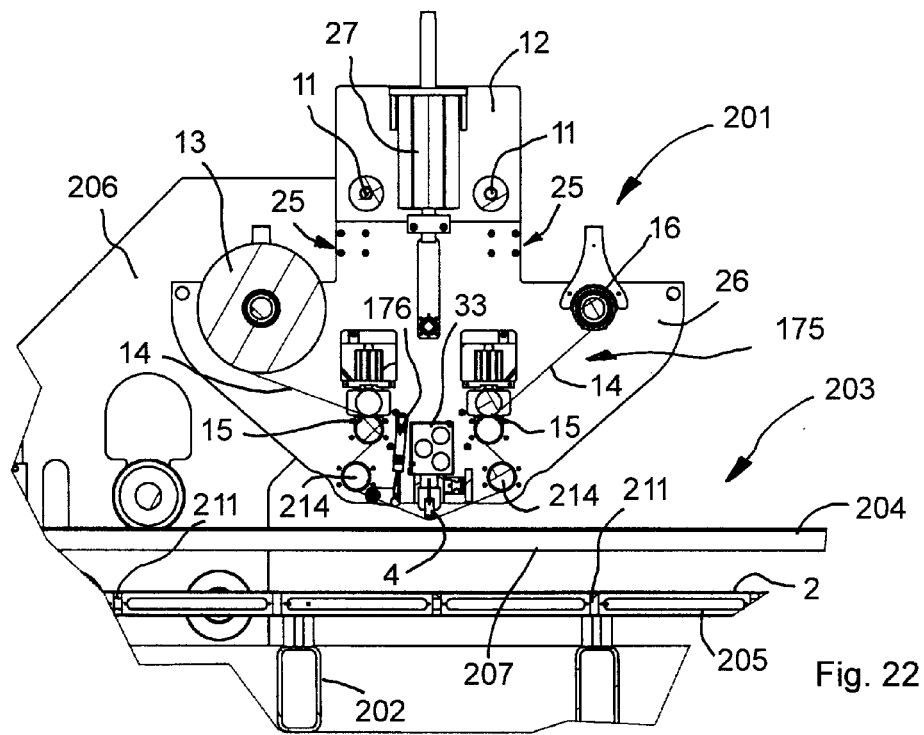
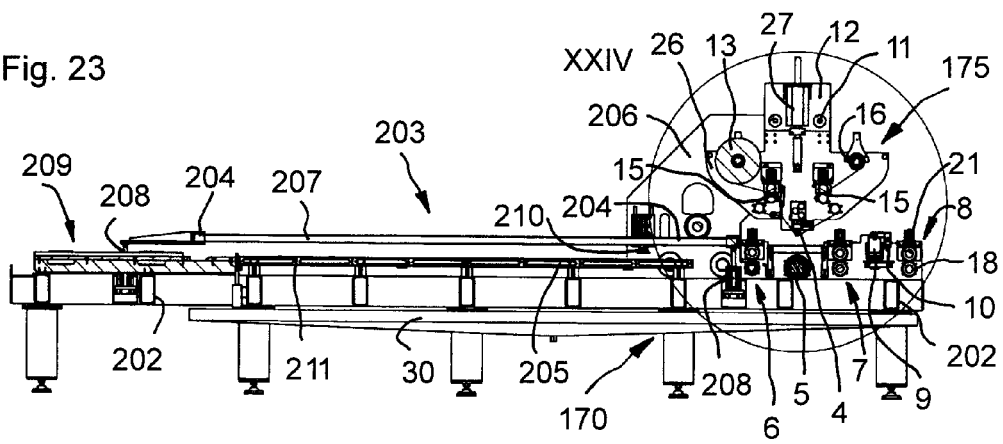

MACHINE FOR THE ELECTRO-MARKING OF LARGE METALLIC SURFACES AND RELATIVE PROCESS

FIELD OF THE INVENTION

This invention relates to a machine for the decoration by electro-marking of large metal surfaces, namely to a machine that provides to decorate the surface of large metallic plates, canvas or even metallic sheet in coil, with a process of electro-chemical marking decoration, executing rapidly the decoration work in such a way to obtain working capacity for a massive industrial production and at a low cost.

KNOWN ART

The background art includes the well-known electro-marking process of metallic surfaces where by using an electrode and an absorbent element of the etching solution, interposed between the electrode and the metal surface, the electro-chemical action of localised oxidation of the metal concerned and exposed to said action is activated.

In the electro-marking a masking for well executing precise forms of oxidation is often used, in such a way to obtain the forms of typographical characters, therefore to make writing, figures, drawings etc. to maintain these latter firmly applied to the metallic surface.

Moreover, in the art is furthermore known, that the electro-marking action of the metallic surfaces, possible when the metallic surface also conducts a slight electric current, to excite the etching action to the metallic surface by the chemical solutions used, is carried out manually, in such a way to restrict the use of this type of writing/decoration to limited areas of metallic surface. On the market etching chemical solutions usable for the electro-marking of different metals as well as for non-anodized aluminium are available, but with unsatisfactory marking results if the manufacturing aim is to obtain large amounts of decorated plates or metallic surface, because the manufacturing must be carried out manually.

Moreover, from the prior art document DE 10344424 a process for the electro-deposition of metals by a galvanic process bath is known. The described apparatus includes a bath of the galvanic solution with the metal to be electro-deposited in solution and a roller with spongy coating, impregnated with the solution, that is put in contact by rolling with the lower surface of the metallic sheet in treatment, that is connected to a first conductor. To carry out the electro-deposition in the surface limited areas a pipe is provided for winding said spongy electrode where through passages or holes the electro-deposition solution deposits only on the areas of the metallic surface concerned that are desired to be treated. The exceeding solution falls from the roller and from the metallic surface in treatment into the underlying collection basin that, to close the electric circuit, receives in immersion an electrode connected with the second electric conductor of the application electric circuit of the galvanic electro-deposition.

The use of the electro-deposition and excitation of the metals surface is described also in the prior art document U.S. Pat. No. 2,540,602, in which to carry out the anodizing treatment on large sheet surfaces of aluminium and other metals a portable apparatus is described, where with a buffer impregnated of specific chemical solution for the treatment, there is a first electrode connected to the circuit of the electrochemical solution activation; the second electrical connector of the circuit is connected to the metallic surface in treatment. The buffer during the treatment is constantly fed with chemical solution. Moreover, a constructive form for the anodizing treatment on large metallic surfaces in which the metallic sheet in treatment is made pass between two rotatable rollers coated with a buffer in absorbent material, where the upper one is fed from inside with the electro-chemical etching solution and feeds the buffer through holes distributed in its surface. The two rollers, the holed and hollow upper one and the lower one, are both connected to an electrical conductor of the electrical excitation circuit of the anodizing electrochemical treatment, the other connector is connected to the sheet in treatment. The chemical solution used and the exceeding one are collected by a basin underlying the rollers, where the lower one is plunged, and put in circle again in the upper roller.

As it can be noticed in none of these documents the technical problem is described or solved for changing the electro-chemical marking from a simple manual action limited in its surface of application during the treatment action on large surfaces and that, moreover, could carry out the metallic surface decoration in a precise and economical way even if large metallic sheet surfaces, metal canvas or metallic sheet in coil are concerned.

In the art of decorating metallic surfaces, with a small but also a large surface and in large amount, the most different ways of superficial printing have been used. Serigraphy and tampography processes with ink, that is transferred and released on the metallic surface without penetrating in it and remaining on the surface as thin layer of ink are known. However all obtain a decoration that with time and usage is destined to be lost due to removal of the ink set, even if consolidated, from the metallic surface or due to the ink decay because of its being photosensitive.

As said above only the electro-marking action lasts in the course of time because it penetrates in the metal itself of the treated surface, even if in very minimum depth in the order of some dozen of nanometers and it can be removed only by mechanical abrasion, namely removing the surface metal itself and it is not subjected to variations due to light action in the course of time.

In fact, the present limit of the art is the impossibility to apply a superficial decoration treatment for electro-marking of the metallic plates with production of large amounts of treated surface, just because of the limits set by a manually executed operation.

Finally, the halftone serigraphy or ink transfer decoration processes which are typical of the decorations of large surfaces in other fields, as ceramic tiles, paper etc. cannot be transferred in this field just due to the peculiarity of the electro-marking work, where in the restricted space between electrode and surface to be decorated a localised electrolytic mini-cell is formed that modifies the surface metal in order to make it change from the original color to the typical color of its oxide.

This background art is susceptible of important improvements with care to the possibility of making an electro-marking machine, for large metallic surfaces and relative decoration process by electro-chemical marking, that overcomes the impossibility of a fast decoration of the large surfaces and makes quick, practical and easy the application to the surface of metallic plates, metal canvas or metallic sheet in coil of an ornament, drawing, writing or scribing.

The technical problem, therefore, that is at the base of the present invention is to make a manufacturing process that re-produces the electro-marking action on large metallic surfaces as the metallic plates, wire cloth or the metallic sheet in coil in an effective and fast way.

An aim included in the previous technical problem is that of making a machine that working on large metallic plates in foil, metal canvas or on metallic sheet in coil applies the electro-marking process rapidly and industrially appreciably for large amounts of surface treated.

Finally, a further part of the technical problem more above exposed refers to the making of an electro-marking machine on large metallic surfaces that results economic to manage and allows to work uninterruptedly also for more hours in such a way to cover one or more consecutive working shifts and, finally, may suit to fast production variations both in the variation of scribing/decoration and in the amount of turn-out.

SUMMARY OF THE INVENTION

This technical problem is solved, according to the present invention, by a treatment process with electro-chemical marking for large metallic surfaces in which an electrode and a buffer impregnated of etching solution is endowed with movement in longitudinal direction with rolling, with respect to the metallic surface in treatment; characterised in that, the electrode is endowed with transverse motion combined with the longitudinal movement of the metallic surface itself or of the electrode with the impregnated buffer and is brought to cover the entire surface in treatment by more sliding passages; the transverse and longitudinal movement is obtained due to the combination of two movements a first advancement and return motion, being indifferently performed by the electrode or by the plate, canvas or metallic sheet in coil, and a second reciprocate motion transverse to the previous one performed by the electrode; the two combined movements obtain a passage of the electrode repeated more times on the same part of surface in treatment; the shape or decoration of the electro-marking is made with a masking applied to the plate, metal canvas or metallic sheet in coil in a successively removable way.

In a specific form the treatment method with chemical electro-marking in which the advancement and return movement occurs with a greater in advancement than in return length in such a way to cover the metallic surface in treatment with an orbital motion of one same contact point of the electrode on the surface.

In a variation of the treatment method the advancement and return movement is performed by the plate, metal canvas or sheet in coil and the difference between the advancement and the return generates the feeding motion of the metallic surface in treatment in the surface treatment point namely in the work region of the electrode.

In an additional form of treatment with electro-marking to carry out the masking necessary to obtain the required decoration a serigraphy screen is used endowed with masking resisting to the electro-chemical action of the etching solution used, in the surface parts in which the marking electrolytic action must be prevented.

In a first constructive form of machine for the electro-chemical marking treatment of metallic surfaces, comprising: an electrode set in sliding movement on the metallic surface to be treated; a buffer impregnated with etching solution for the specific metal in treatment; an electric current circuit, suitable for electro-marking treatment of said metal, with a conductor connected to the electrode and the other conductor connected to the metallic surface in treatment; characterised in that to treat large metallic surfaces on plates, metal canvas or on metallic sheet in coil, the plate, canvas or the metallic sheet is placed in an electro-marking mechanism in a reciprocally movable way with respect to the electrode, in such a way to allow the electrode the marking electrochemical action on the surface to be treated even if the electrode is of limited size with respect to said surface; the electrode being movable in the and/or with the electro-marking mechanism; the buffer being impregnated with the etching solution at regular gaps; the relative motion of the electrode on the surface being the combination of two longitudinal and transverse relative movements.

In an additional constructive form of the machine, a decoration of the treated surface is carried out by means of a masking, consisting of a material resisting to the etching action of the solution used to prevent the oxidizing effect caused by electro-marking where necessary, and placed on the surface to be treated, to obtain a desired decoration with the electro-marking action only in the metallic surface part non-protected by the masking; said masking being removed after the treatment.

In an improved constructive form the machine presents the masking made with a screen, resisting to the specific etching solution, placed in relation to the plate, canvas or metallic sheet in coil; after the treatment the screen is removed remaining intact and applied on a new surface to be treated of other plate or other section of canvas or metallic sheet in coil.

Moreover, in a preferred embodiment the advancement motion is performed by the plate, metal canvas or metallic sheet in coil.

Furthermore, in an improved constructive form there is a passage electro-marking station of plate, metal canvas or metallic sheet in coil associated to a frame structure where the metallic surface is electro-marked on a support plane with the electro-marking mechanism sliding on a carriage movable over said support plane.

Moreover, in a further improved constructive form there is a passage electro-marking site for plate, metal canvas or metallic sheet in coil endowed, to carry out a specific electro-marking decoration, with a serigraphy screen, with masking resisting to the etching solution, drum-like shaped and placed in synchronous movement with the feeding of the plate, canvas or metallic sheet in coil.

Furthermore, in an improved execution the movable electrode inside the drum-like screen is endowed with transverse and longitudinal motion around the tangent parallel to the axis of the contrast roller underlying the movable electrode.

In a specific constructive form, moreover, the machine presents the electro-marking mechanism which includes a roller of support and contrast to the electrode, roller cooled by means of internal holes with a cooling liquid, and pairs of dragging rollers for the motion of the metallic surface in treatment, so that the plate, the metal canvas or the metallic sheet can advance and withdraw even more times towards the electrode position.

Furthermore, in an improved execution the electrode is made in a single element to cover the complete width of the plate, metal canvas or metallic sheet in coil, being endowed with inside passage for a cooling liquid.

Moreover, in an additional execution the electrode is subdivided in elements or sections fed separately by the etching solution, by the electric current conductors and with specific pipes for the connection to a circuit with cooling liquid in channels internal to the single element.

Finally in the aforementioned constructive forms there is a buffer made with a felt belt, having the electrode total width, and interposed between it and the metallic surface in treatment; the electro-marking mechanism includes a movement mechanism of the felt belt in which there is a felt belt feeding roller, at least one pair of motor-driven rollers for dragging the felt downstream of the electrode, at least one belt tension means upstream of the electrode, as well as a winding roller of the used felt belt.

Further characteristics and advantages of the present invention, in the execution of a machine or a method for the decoration by electro-marking of large metallic surfaces, will be evident from the description, made in the following, of embodiment examples given as indicative and non-limitative with reference to the seventeen enclosed drawing tables.

BRIEF DESCRIPTION OF THE DRAWINGS

FIG. 1 represents in schematic form the movement of an electrode transverse to a plate, planar surface in treatment, and/or of the same plate, to activate the chemical electro-marking action, with the work method and the machine forms hereinafter described;

FIG. 2 represents a schematic view in perspective of the electro-marking machine for large plates according to the present invention in a first embodiment for passage plates or for sheet in coils;

FIG. 22 represents an XXII-XXII schematic section of the single carriage with the electrode of FIG. 5;

FIG. 23 represents a schematic section longitudinal to the machine of FIG. 15 with the movable carriage placed at one end of the machine at the position of decoration or passage electro-marking of plate, canvas or metallic sheet in coil;

finally.

DETAILED DESCRIPTION OF PREFERRED EMBODIMENTS

Figure 3:
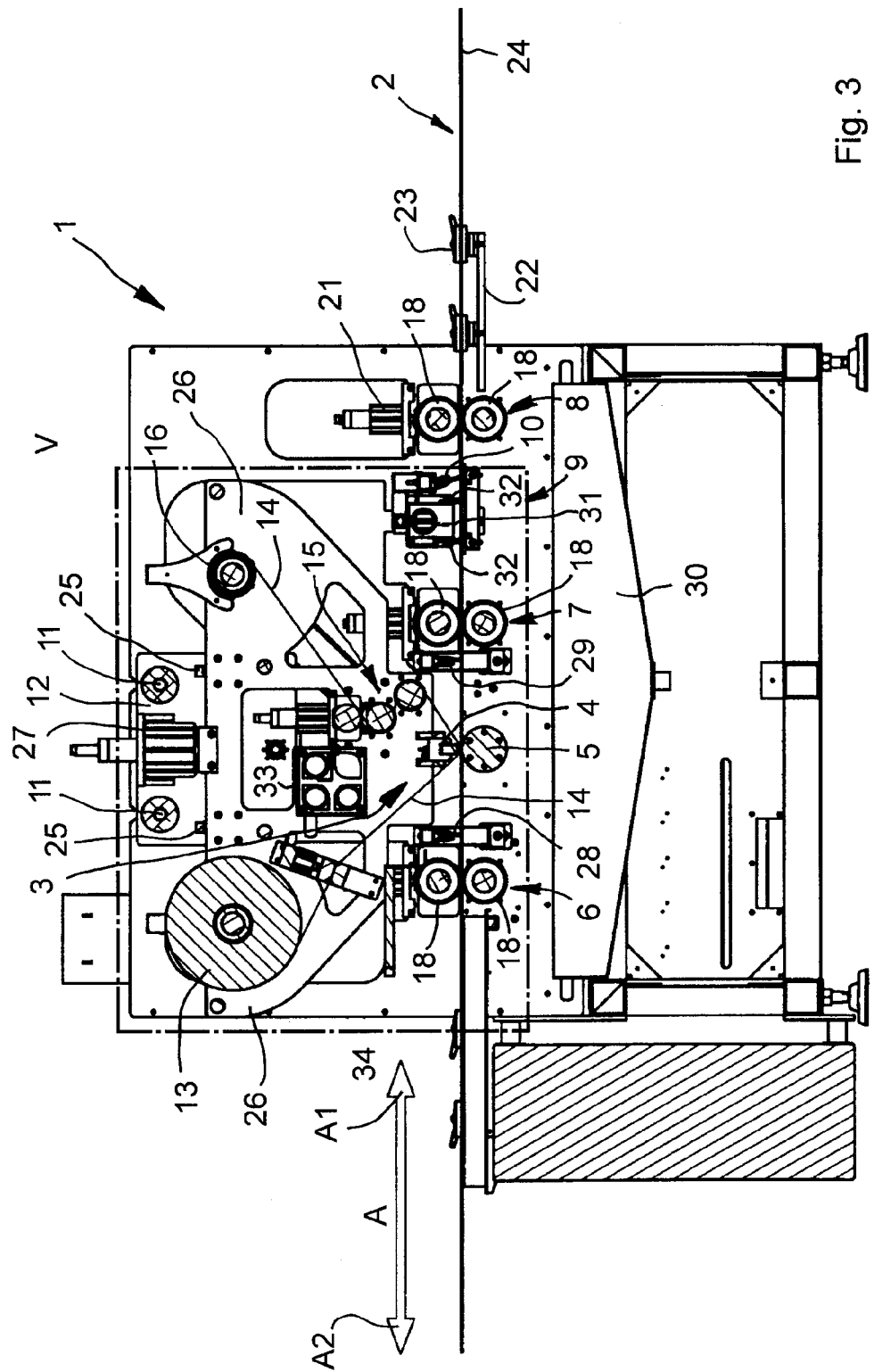
FIG. 3 represents a longitudinal schematic section, according to the movement direction of the plates, of the machine of FIG. 2, in order to see the components internal to the machine.
Figure 4:
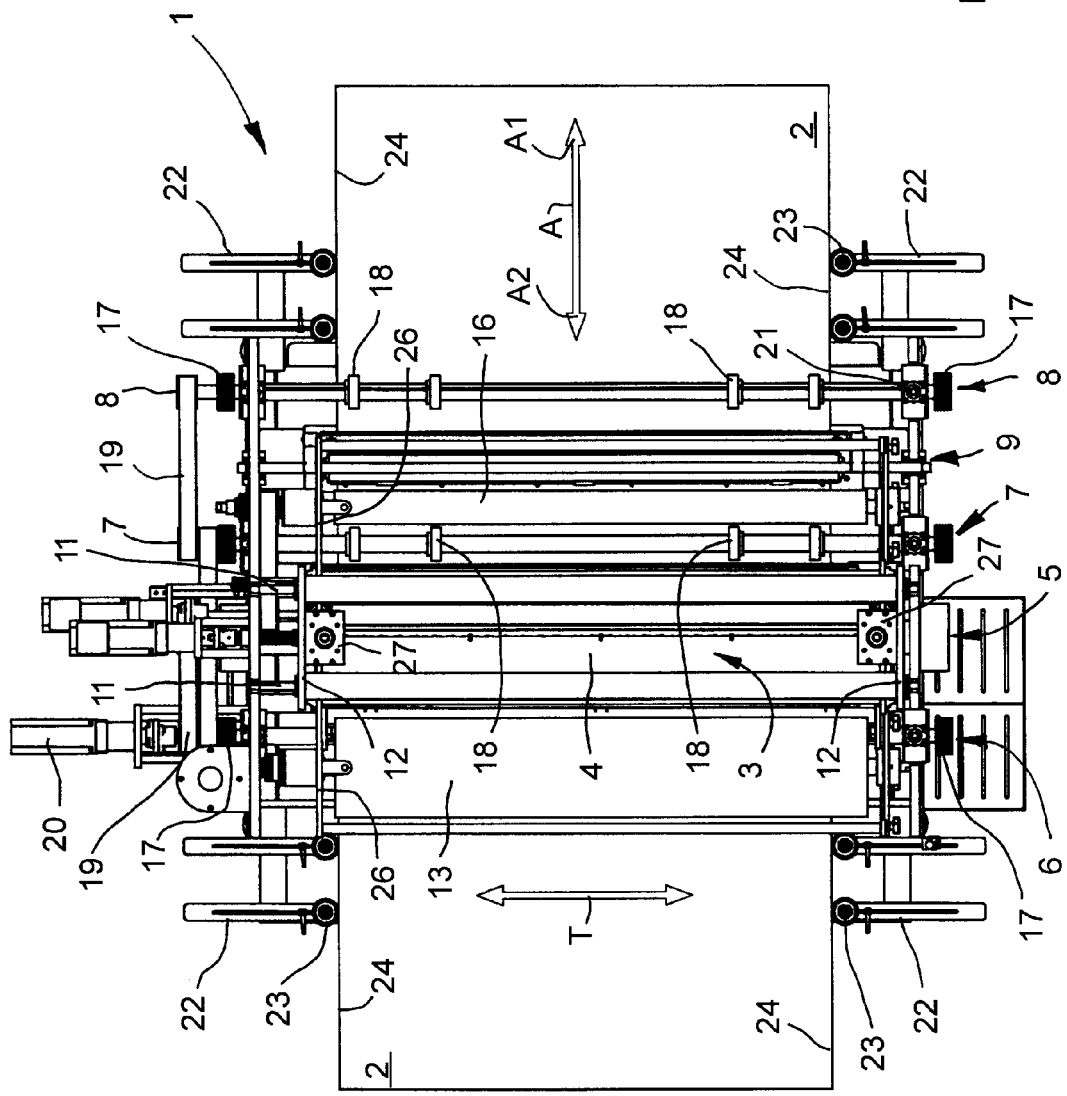
FIG. 4 represents a plan schematic view of the electro-marking machine of FIG. 2.

FIG. 1 shows the setting of the relative motion between an electrode E, if necessary consisting of separately replaceable elements Es, in contact with a metallic surface ST in treatment for the electro-marking. The relative motion consists of two movements a transverse one T, performed by the electrode E with respect to the treated surface, the longitudinal other one A, that is also subdivided in Av of advancement and in Ar of return, concerning the surface in treatment ST or as an alternative to the electrode E, to perform such a combined motion to bring any point of the electrode E, for example P or Q, to carry out an orbital motion similarly to curved spirals Vp or Vq and in sequence with advancement in the Av-Ar, motion difference in such a way to cover the whole surface in treatment ST.

In the following Figures electro-marking machine constructive forms are represented that apply said combined movement to decorate the metallic surface in treatment and cover this same completely, thus executing the best electro-marking mechanical effect, that uniforms the execution of the treated surface without leaving unevenness or signs in the treated surface, which would be very anti-aesthetic.

In the Figures from 2 to 4 a first constructive form of electro-marking machine 1 for large surfaces, here without the external shell to better enhance the internal constituents is visible. A metallic plate 2 is represented during the electro-marking work; it moves in the machine according to the A direction as will be better described afterwards. An electro-marking mechanism 3 for large surfaces is moved, with obviously reciprocating motion and centred on the centreline of the plate 2, in the transverse direction T, in such a way to perform an orbital motion, in the combination of the two movements of plate and mechanism, for an electrode 4, fed by a conductor through an electric circuit and electric current suitable for the electro-marking work of the plate specific metal. The other conductor, also this connected to the electric circuit, is connected with a rotating and contrast roller 5 of the plate to which it yields the continuity of the own electrical contact just in the vertical position of the electrode 4. The plate 2 is dragged in the motion A by pairs of rollers 6, 7 and 8 the first two 6 and 7 placed upstream and downstream of the position of the electrode 4 the third pair of rollers 8 is placed after the washing position 9 and the raking doctor-blade 10 of the washing water residues from the chemical etching solution. The electro-marking mechanism 3 is supported sliding transversely to the plate 2 on upper guides 11 and includes in addition to the shoulders 12 also the feeding roller 13 of the felt belt 14, intended to receive the chemical etching solution and to be replaced after a predetermined work time with traction on motor-driven rollers 15, and finally wound on winding roller 16. Each pair of rollers 6, 7 or 8 rotates in synchronism by the gears 17 and acts on the plate 2 wheeled in soft material 18 by friction. The pairs of dragging rollers are connected to one another and set in movement by motion drive 19, advantageously with toothed belt, actuated by an electrical ratio-motor 20. There are provided also vertical press cylinders 21 to keep the contact between the rollers of the pairs 6, 7 and 8 and to transmit the dragging push to the plate 2. Thus, the plate 2 is maintained in support and sideways guide, contrasting the motion T of the electro-marking mechanism 3, by means of bearing backings 22 for external guide wheels 23 on the side edge 24, of the plate 2 or even of metal canvas or sheet in coil that, when unwound, is introduced in the electro-marking machine 1 similarly to the represented plate. The electro-marking mechanism 3 includes on the shoulders 12 of the vertical guides 25 that drive the vertical movement of the sides 26 of the mechanism 3 and therefore the electrode 4 and the path and support devices of the felt belt 14, rollers 13 and 16 and advancement motor-driven rollers 15, to approach the electrode and the felt belt on the upper surface of the plate 2 under the action of vertical press pistons 27.

Moreover, upstream and downstream of the treatment point, namely where the electrode 4 approaches the plate 2 surface, two doctor-blades 28, upstream, and 29, downstream of this point are placed to prevent the electrochemical etching solution from coming out of the band delimited by them. The exceeding etching solution overflows sideways on the edges 24 of the plate 2 and falls in the underlying collection basin 30. In the washing position 9 the plate is water sprayed by jets 31 between two retaining spatulas 32; the jets and the spatulas concern the whole width of the plate 2 and, downstream of the washing position, by the end doctor-blade 10 all the water that remains in the surface of the plate is collected and made outcome sideways in the underlying collection basin 30.

The advancement motion A of the plate in treatment of the electro-marking mechanism 3 is carried out in reciprocating way. In fact, the motion A presents two directions A1 forward, from the introduction of the plate, canvas or sheet in coil towards the treatment point, and A2 in opposite direction, namely for making the plate withdraw after an advancement with direction A1. As previously said the transverse motion T of the electro-marking mechanism 3 is reciprocating and centred on the centreline of the plate 2 or sheet in treatment. The total motion between the electrode 4, that is carried sideways with the motion T, and the plate 2, that is endowed with advancement motion, in direction A1, and return motion, in direction A2, is obtained with an orbital positioning of the electrode, in sequence on the surface of the plate to be marked. In order to offer always new plate surface to be treated to the mechanism 3 the advancement in direction A1 must be greater than the withdrawal in direction A2, namely by successive steps the plate advances always more than it withdraws. In this way the electro-marking action of the electrode 4 is uniform on the treated surface of the plate 2 or sheet, namely it makes the covering of the whole surface in treatment with spirals of the orbital motion combined between advancing A and transverse T motion.

Figure 5:
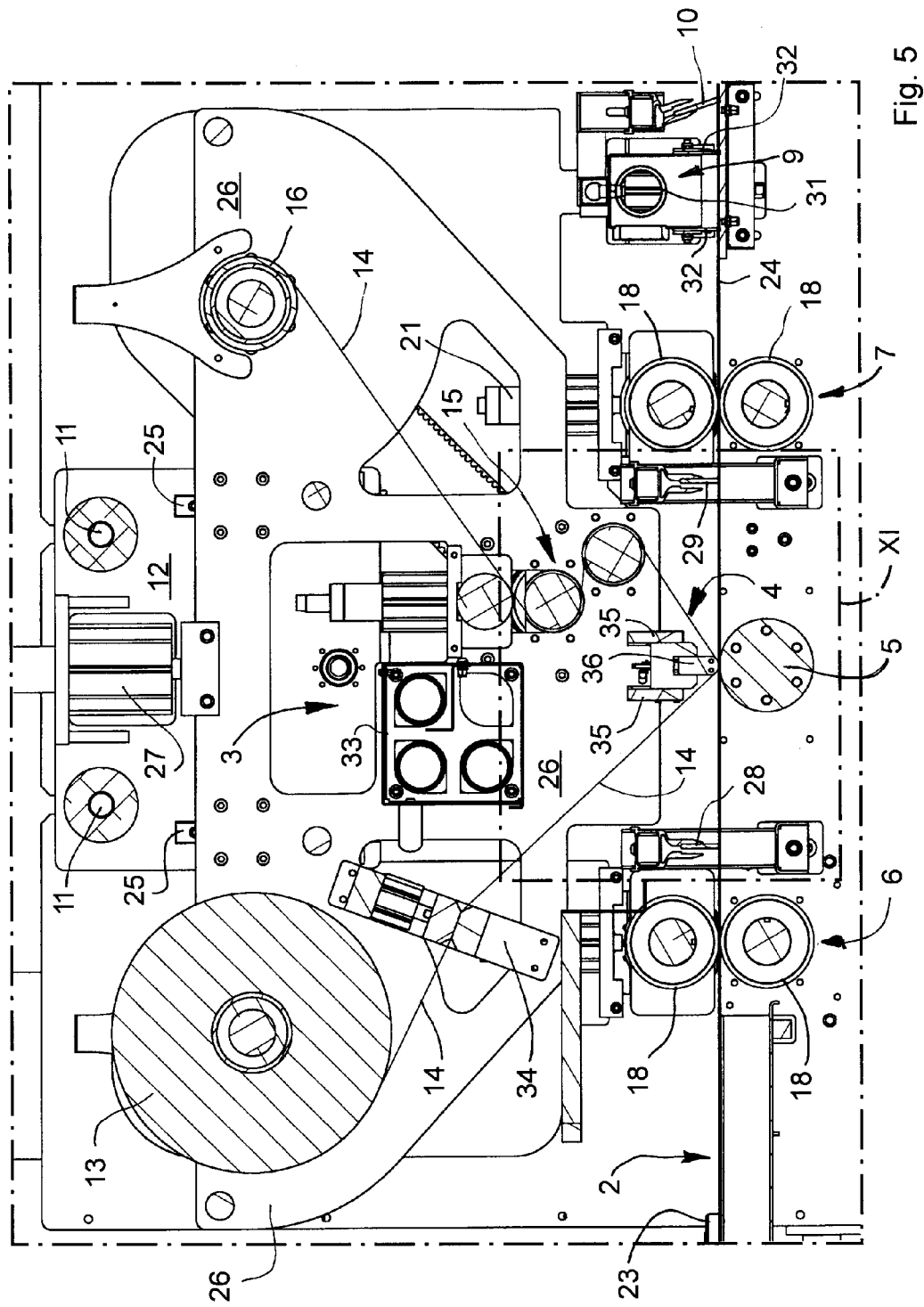
FIG. 5 represents a V enlarged limited schematic section of FIG. 3 to show the path of the felt belt for the buffer absorbing the chemical solution of impregnation and replacement of the same by the use.
Figure 6:
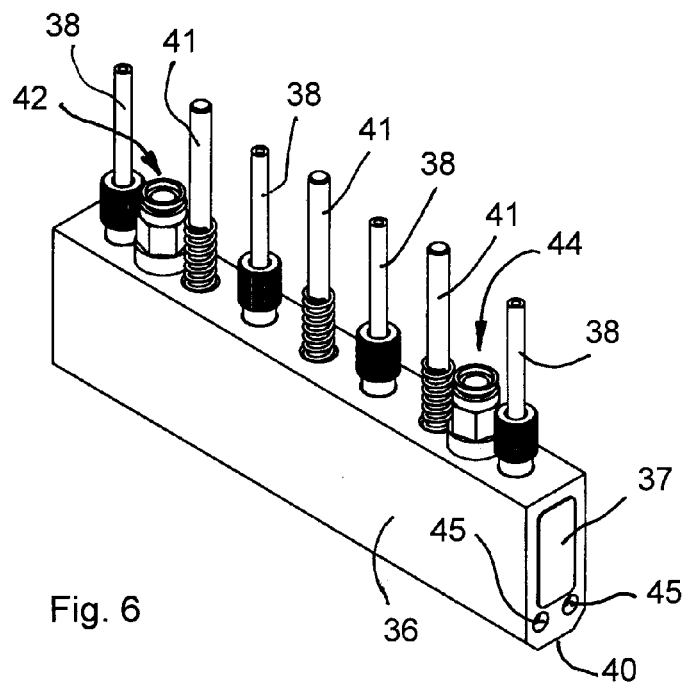
FIG. 6 represents a schematic view in perspective of a single section or element of electrode on which there are the different electrical connections, for the feeding of the etching solution and connection of a circuit with cooling liquid.
Figure 7:
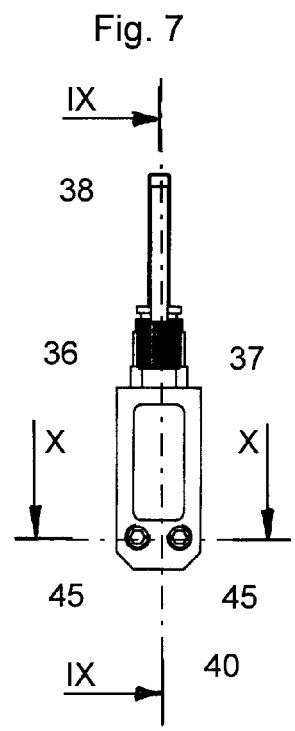
FIG. 7 represents a transverse schematic view of the electrode for the electro-marking treatment of large plates of FIG. 6.

In the FIG. 5 is represented a raceway 33 transverse to the electro-marking mechanism 3, and movable with the sides 26, within which connection electric wires, not represented, with the electrode 4, etching solution feeding pipes, these latter also not represented, and delivery and return pipes of cooling liquid for the electrode 4, also these not represented for clearness are placed. On said sides 26 a tensioning device 34 of the felt belt 14 between the feeding roller 13 of the felt belt and the electrode 4 are positioned; then downstream of the electrode the felt belt is wound in the motor-driven dragging rollers 15, to be picked up on the final winding roller 16, after its period of use, as an element for maintaining the etching electro-chemical conditions, for a considerable effect of the electro-marking etching between the electrode and the surface of the plate 2. The sides 26 bear, by means of transverse guides 35 the single elements of electrode 36 in a sprung way so to press with a constant load on the surface of the plate 2 or sheet in treatment.

In the FIGS. 6, 7 and 9, 10 is represented the improved electrode suitable to large surfaces to treat with the decoration in which an element of electrode 36 is adjacent and aligned with a next element of electrode 36 by means of insulating backings 37 that allow its relative sliding, but determine the insulation between two contiguous electrode elements. On each electrode element there are feeding pipes 38 of the etching solution, that by means of holes 39 deliver the solution in the lower face 40 of the element of electrode 36. Moreover, are indicated the terminals 41 of the electric wires for the electric connection between the single element of electrode 36 and the electric circuit; in the element of electrode 36 are placed also a cooling liquid feeding hole 42 and two longitudinal holes 43, made in proximity of the lower face 40, for the passage of the cooling liquid up to a liquid outlet hole 44; the feeding and the outlet of the cooling liquid occur by means of pipes, as said, not represented for clearness; the longitudinal holes 43 are closed at the ends of the electrode element by plugs 45, to facilitate its construction and maintenance.

Figure 12:
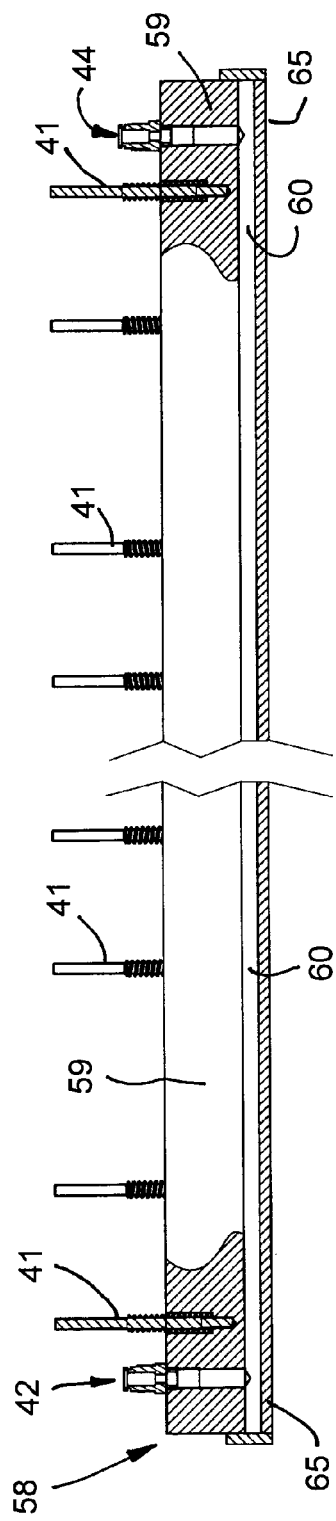
FIG. 12 represents a XII-XII longitudinal schematic section of the simplified single electrode of FIG. 11.
Figure 11:
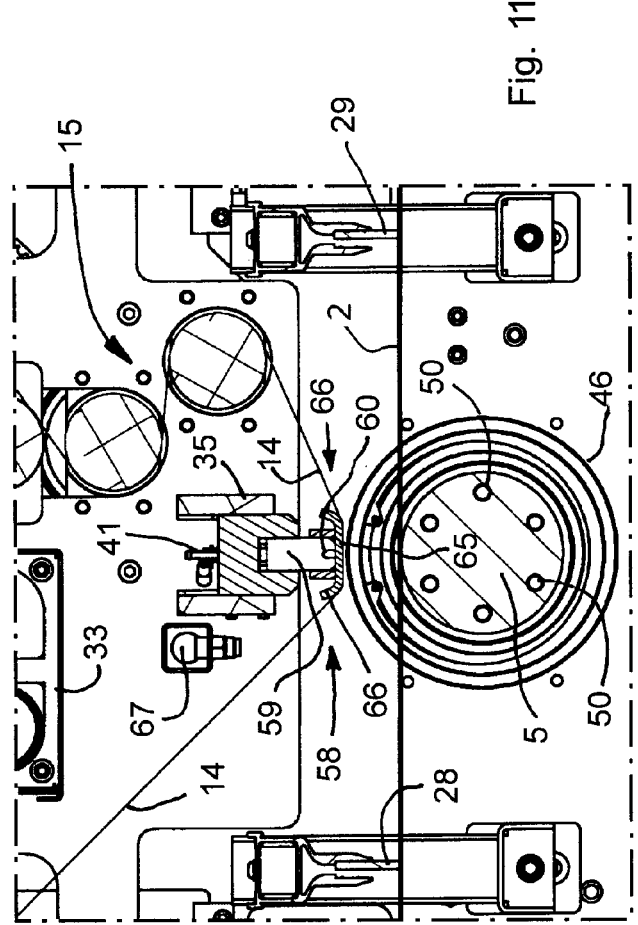
FIG. 11 represents a limited and enlarged schematic section, in the position indicated with XI of FIG. 5, of the electro-marking mechanism with a simplified constructive form of electrode in plate full width, advantageously used in the complete and even electro-marking of the plate, canvas or sheet in coil in treatment.

In the FIGS. 11 and 12 a simplified electrode 58, in a single piece, is placed in the electro-marking mechanism 3 between the doctor-blades 28 and 29 and includes a body 59 within which are arranged the terminals 41 of the electric wires connecting the electrode to the generator; a feeding hole 42 of the cooling liquid and an outlet hole 44 of the liquid at the opposed end of the body 59 of the electrode. A groove 60 is present in the underside of the body 59 within which the cooling liquid flows; the groove is closed at the bottom by a cap 65 for the total length of the electrode and presents rounded edges 66 for entry and exit of the path of the felt belt 14. The etching solution is distributed on the felt belt in position immediately before the electrode 58 by means of spraying nozzles 67, so the felt belt 14, by the advancement, carries the etching solution between the electrode 58 and the surface of the plate 2.

Figure 8:
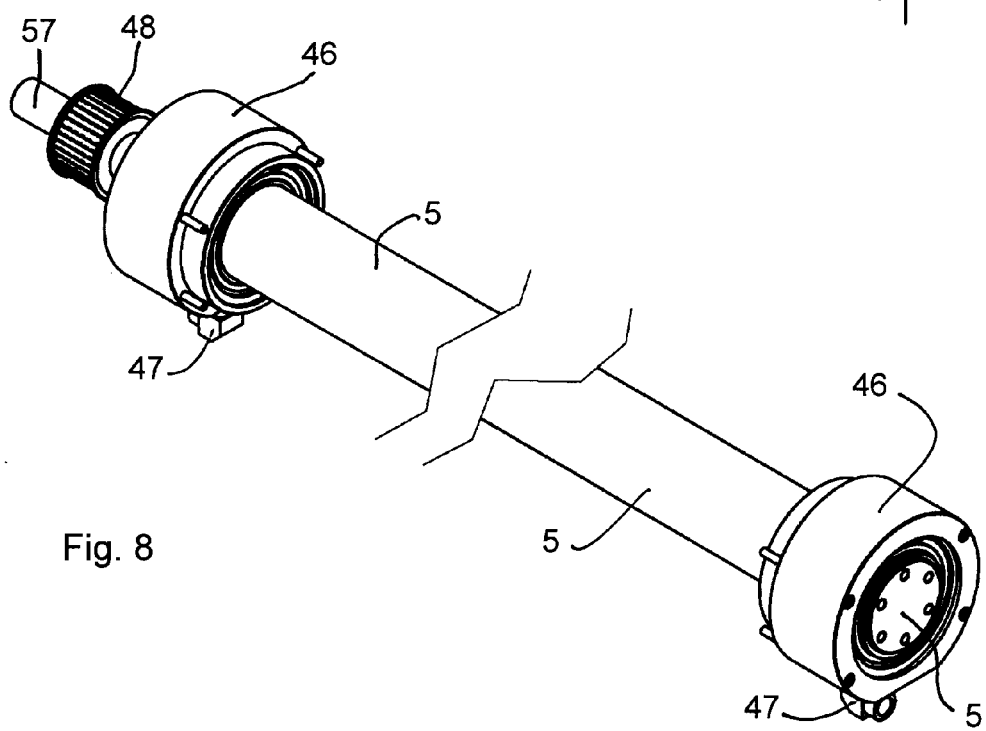
FIG. 8 represents a perspective schematic view of the roller for the contrast and support of the metallic surface in treatment, with the rotary supports, with respect to the supporting structure of the machine, for the connection of a circuit with cooling liquid.
Figure 9:
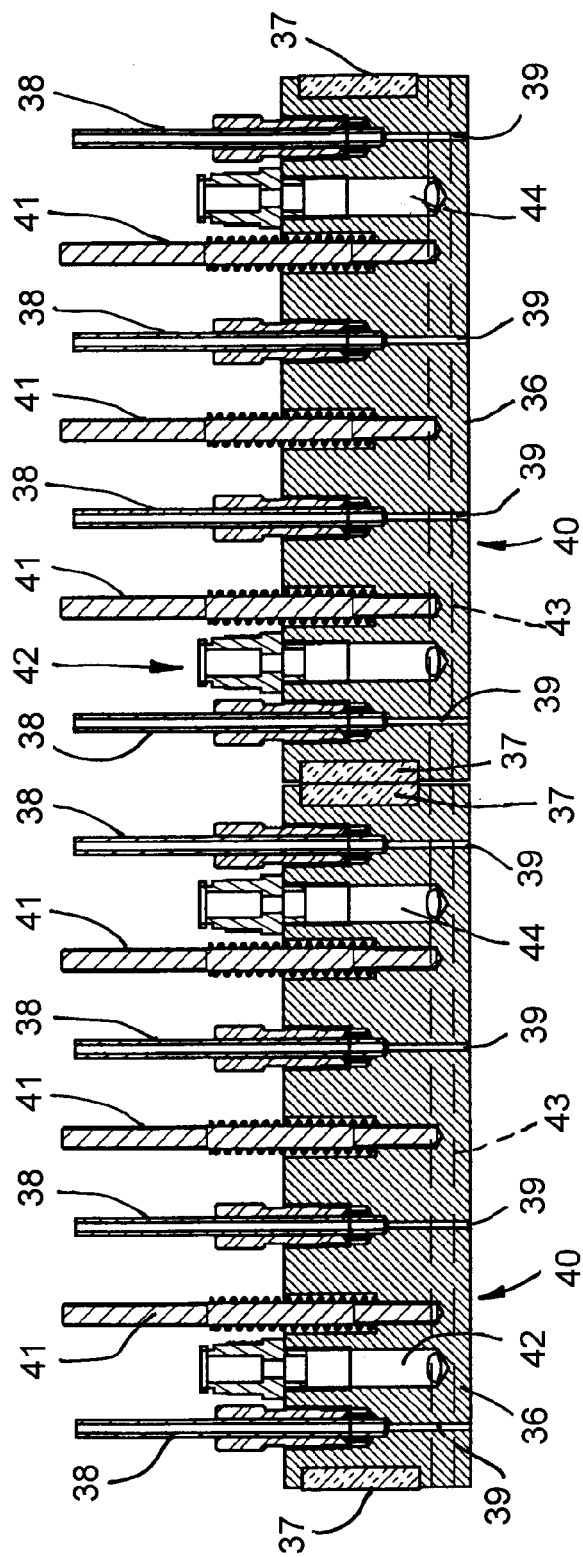
FIG. 9 represents an IX-IX schematic section of the electrode of FIG. 7, shown with two approached different sections of electrode element.
Figure 10:
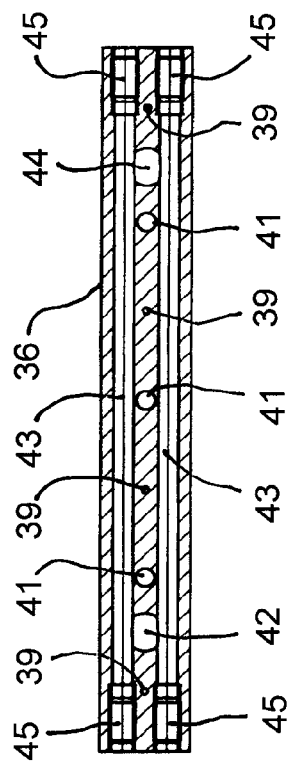
FIG. 10 represents a plan schematic section of the cooling holes internal to the electrode, with X-X track of FIG. 7.
Figure 13:
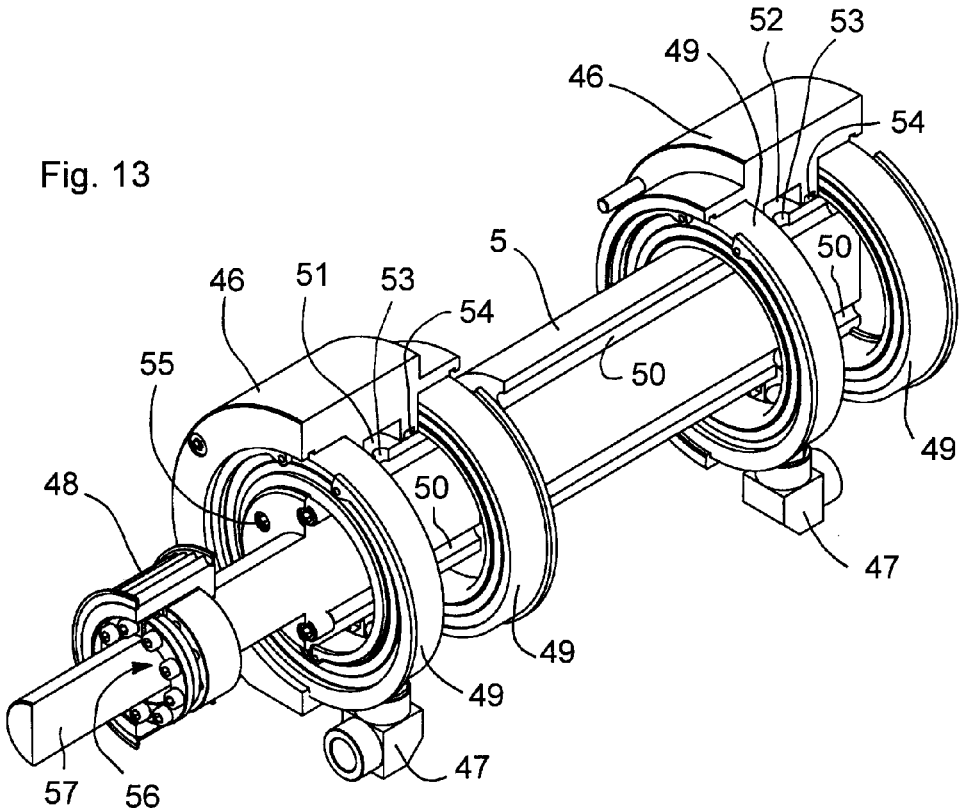
FIG. 13 represents a perspective schematic view of the rotating contrast roller with the roller itself sectioned to show the longitudinal holes to the roller and made in proximity of the external diameter for support of the lower surface of the metallic plate, or metallic sheet coil, in treatment.
Figure 14:
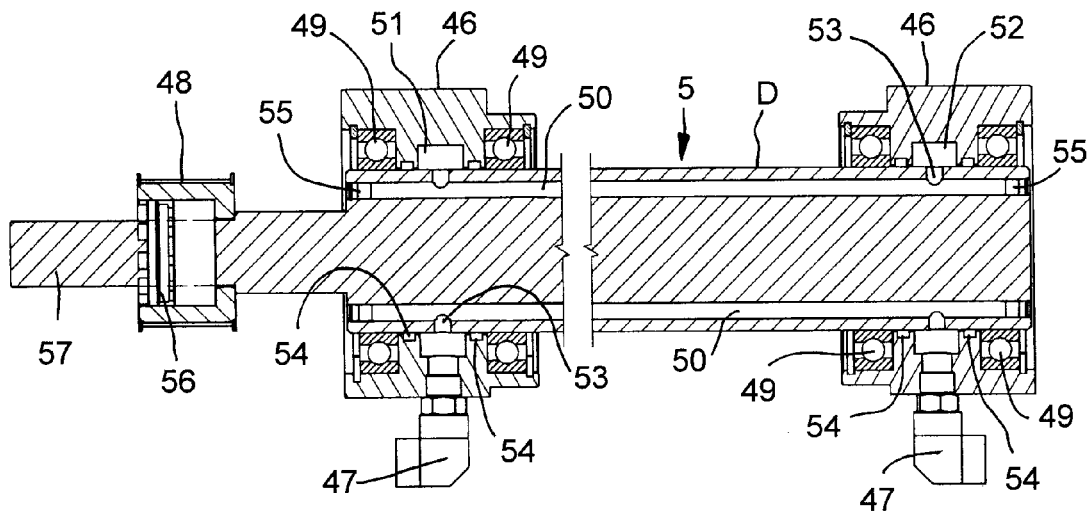
FIG. 14 represents a schematic section on an axial plane of the rotating contrast roller and of the supports for the connection and rotation of the cooling liquid circuit.
Figure 15:
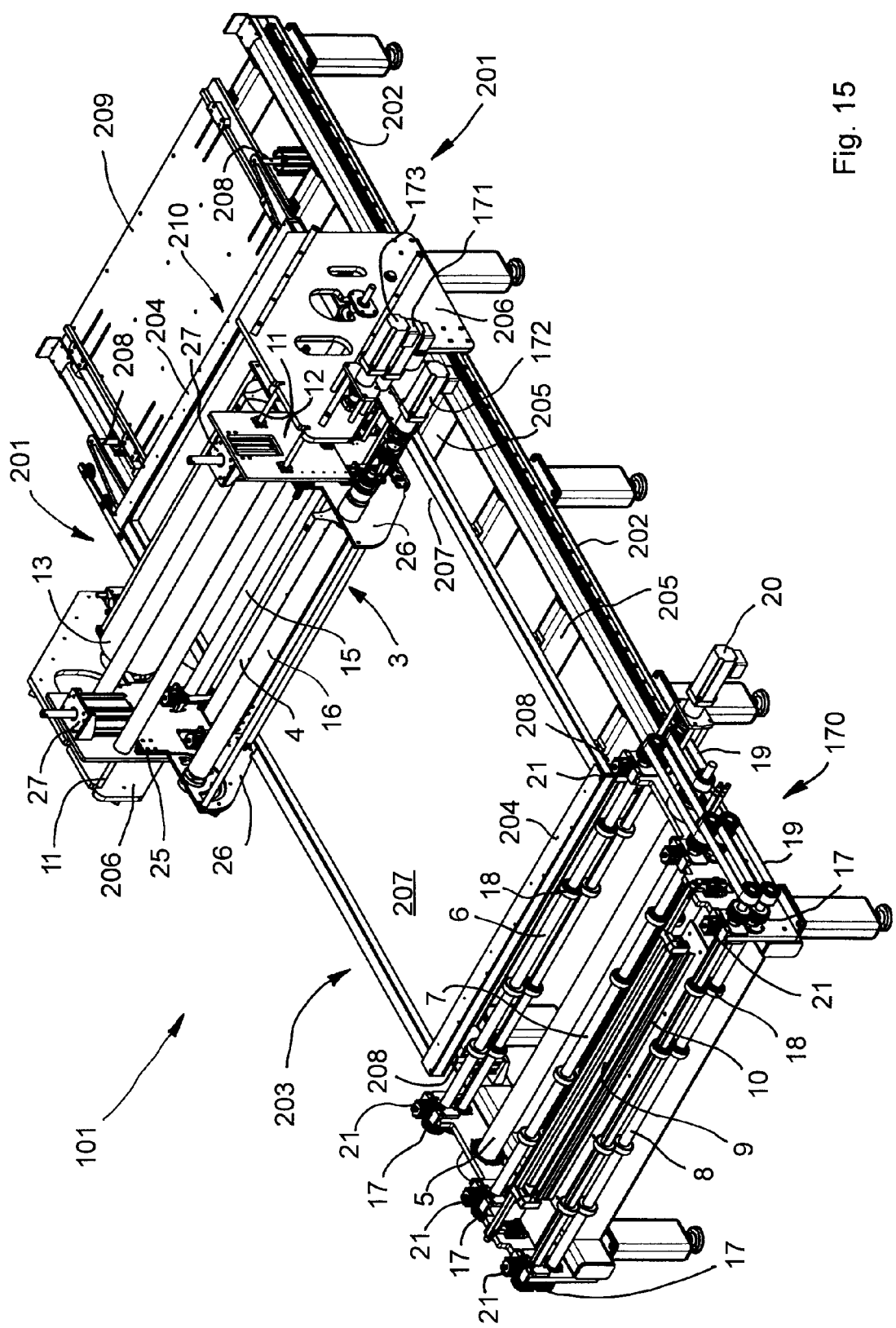
FIG. 15 represents a schematic view in perspective of an electro-marking machine for large plates and movable carriage with a transversely oscillating electrode, according to a second constructive form of the present invention.
Figure 16:
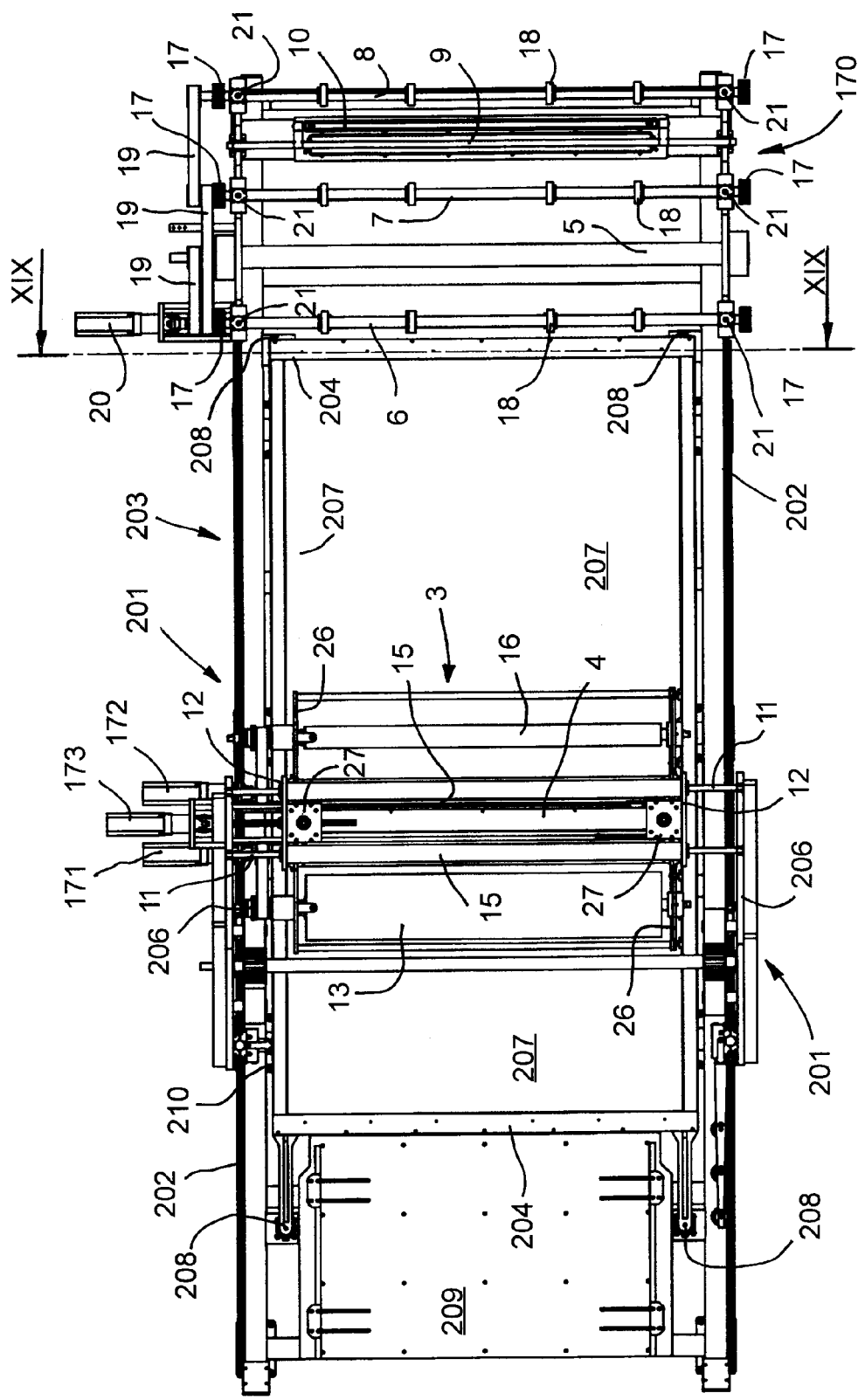
FIG. 16 represents a plan schematic view of the electro-marking machine of FIG. 15.

In the FIGS. 8, 13 and 14 the contrast roller 5 is represented with supports 46, for the rotation with respect to the bearing structure and connecting the circuit of the cooling liquid by means of connections 47; the motion is transmitted to the roller by the toothed pulley 48. The roller is made rotating on the supports by means of rolling friction bearings 49 and presents axial peripheral holes 50, made in proximity of the external surface D of the contrast roller 5, for the sliding of the cooling liquid from an inlet hollow ring 51 to an outlet hollow ring 52: the radial holes 53 connect said inlet and outlet rings to the respective axial peripheral holes 50; on the sides of the hollow rings rotating seals are provided in seats 54 and, finally, plugs 55 are placed to close the axial peripheral holes 50, to facilitate their construction and maintenance; a front clutch 56 allows the rotary connection of the electromotor shaft 57, here not represented, to facilitate its maintenance.

In a second constructive form of Figures from 15 to 24 an electro-marking machine of large plates offers the longitudinal motion to the metallic plate belonging to the electrode and a passage station where the electrode performs the functions already described in the first constructive form. The machine parts identical or similar to the first constructive form have identical numerical references.

In the Figures an electro-marking machine for large surfaces 101 is visible, here without the external shell to better enhance the internal constituents. A movable carriage 201 is sliding on the structure 202 of the machine sideways to a plane 203 for electro-marking a metallic plate, here not represented in static position on said plane; moreover, the machine 101 is equipped with station 170 in which the movable carriage can be placed, for the chemical electro-marking with plate, metal canvas or metallic sheet in coil on passage according to the direction A. An electro-marking mechanism 3 for large surfaces is moved, with obviously reciprocating motion and centred on the centreline of the plate, canvas or sheet, in the transverse direction T, in such a way to perform an orbital motion, in the combination of the two movements with the plate, in the position of the electro-marking passage station, and/or of the movable carriage 201 mechanism that makes both movements, for an electrode 4 fed by a conductor, from the electric circuit, and electric current suitable for the electro-marking processing of the specific metal of the plate. The other conductor, also coming from the electric circuit, is connected with the support plane 205 of the plate of the electro-marking plane 203 and with a rotating and contrast roller 5, in the station of electro-marking and passage station 170, of the plate, canvas or sheet to which it yields the continuity of its own electrical contact in the vertical position of the electrode 4, when the carriage 201 is placed in steady way in the passage electro-marking station 170. The movable carriage 201 supports by means of its lateral sides 206 the electro-marking mechanism 3 in a transverse oscillating way, to perform the motion T of the electrode 4 on the surface of the plane 203, or in case of the carriage arranged in the station 170 over said contrast rotating roll 5. On the electro-marking plane 203 a supporting frame is provided 204 with a screen 207 of serigraphy type made movable vertically by actuator means 208 of lifting and lowering in the prearranged treatment position of the plate, canvas section or metallic sheet section to be decorated.

In the passage electro-marking station 170 a plate, when the movable carriage 201 is placed in the station, is dragged in the motion A from pairs of rollers 6, 7 and 8 the first two 6 and 7 placed upstream and downstream of the position of the electrode 4, the third 8 after the washing position 9 and the doctor-blade 10 raking the residues of the washing water with the residues of the chemical etching solution. Each pair of rollers rotates in synchronism for the gears 17 and acts on the plate wheeled in soft material 18 by friction. The pairs of dragging rollers are connected to one another and placed in movement by motion drive 19, advantageously by toothed belt, actuated by an electrical ratio-motor 20. There are also press vertical cylinders 21 to maintain the contact between the rollers of the pairs 6, 7 and 8 and transmit the dragging push to the plate.

The electro-marking mechanism 3 is supported transversely sliding with respect to the lateral sides 206 of the movable carriage 201 on upper guides 11 and includes in addition to the shoulders 12 also the feeding roller 13 of the felt belt 14, here not-visible for clearness, intended to receive the chemical etching solution and to be replaced after a predetermined work time with traction on motor-driven rollers 15, and finally wound on winding roller 16. Moreover, on the shoulders 12 there are vertical guides 25 that drive the vertical movement of the sides 26 of the mechanism 3 and thus the electrode 4 and the path and devices supporting the felt belt, rollers 13 and 16 and advancement motor-driven rollers 15, to approach the electrode and the felt belt on the surface in treatment of the screen 207 or that upper one of the plate, in the position of the station 170, under the action of vertical press pistons 27. Moreover, the transmission of motion to the motor-driven rollers 15 is carried out by ratio-motors 171 and 172, also for operating the winding roller 16 of the felt belt, while the ratio-motor 173 controls the oscillating motion of the electro-marking mechanism 3 on the upper guides 11. In the station 209 for loading the plates or the metallic sheet are placed for the taking of suckers 210 to a lower level of the screen 207 when lifted; the suckers are connected to the movable carriage 201 for towing the plate or metallic sheet in the position of decoration, centred in the electro-marking plane 203, or for the introduction of the aforementioned in the station 170 of decoration with passage electro-marking, for the taking with the pairs of rollers 6, 7 and 8.

Figure 17:
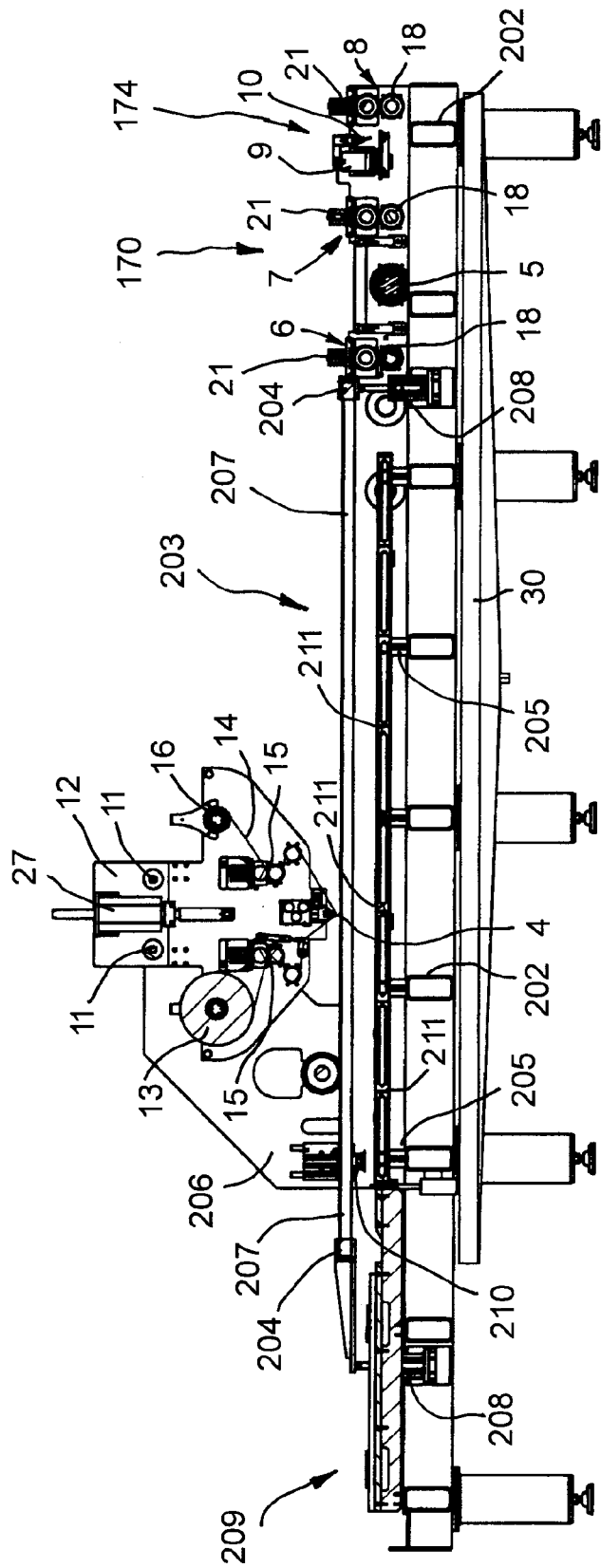
FIG. 17 represents a longitudinal schematic section, according to the movement direction of the plates, of the machine of FIG. 15, in order to show the components internal to the machine.
Figure 18:
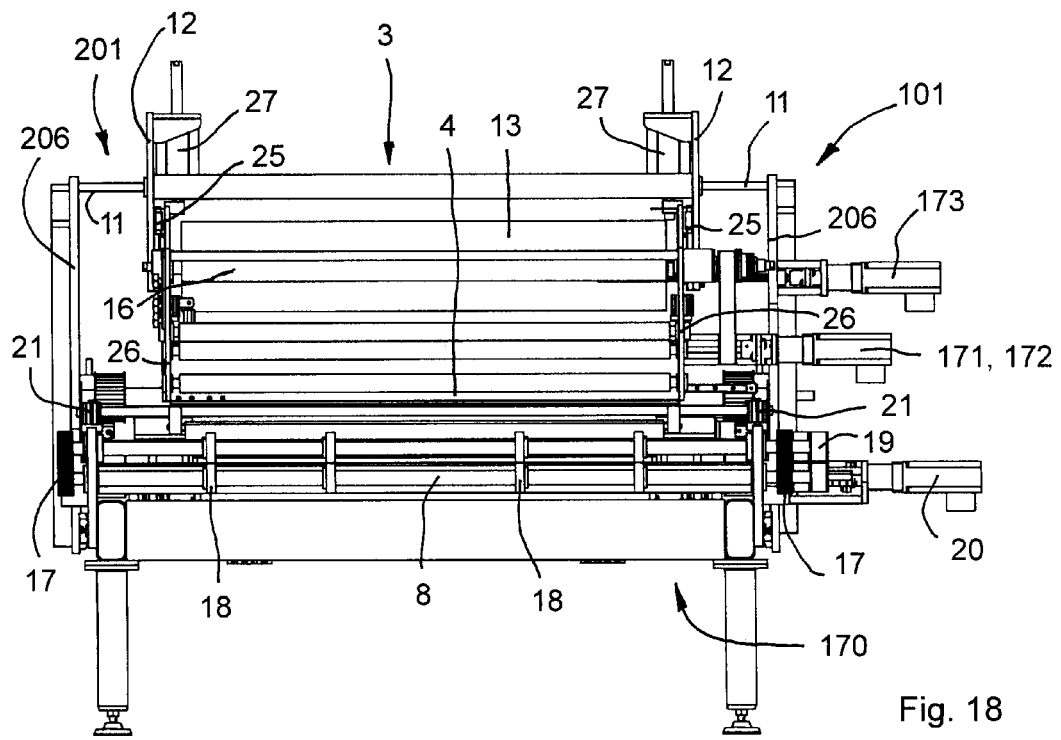
FIG. 18 represents a schematic view in axis to the motion direction of the plates and of the sheet in coil from the introduction end of the plates, canvas or metallic sheet in coil.
Figure 19:
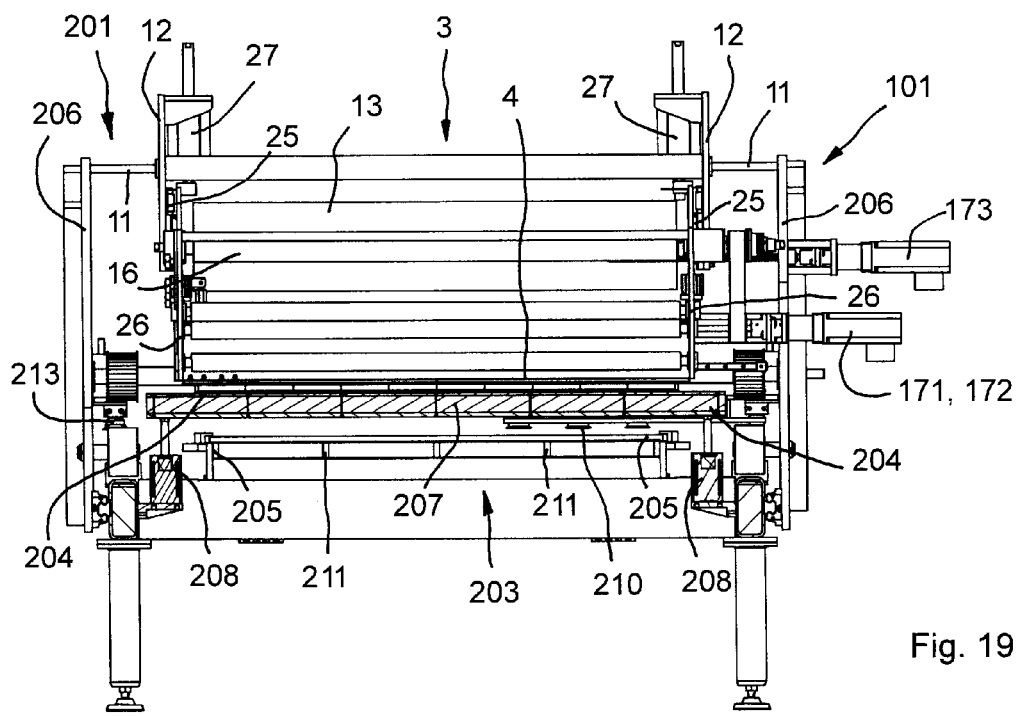
FIG. 19 represents a XIX-XIX schematic section of FIG. 16 to show the screen operating internal components.
Figure 20:
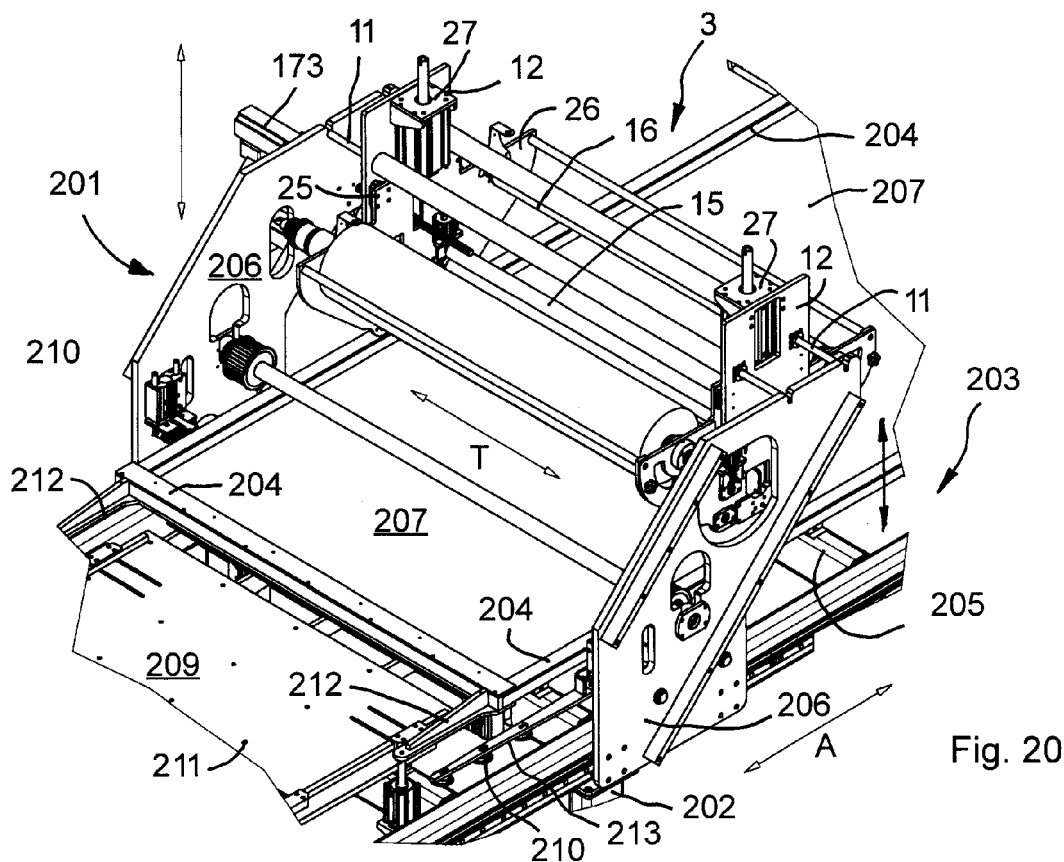
FIG. 20 represents a schematic view in perspective of the supporting and moving carriage of the decoration electrode, here in a position next to the entry side of the plate or sheet in coil under the screen.

In the FIGS. 17, 18 and 19 are, moreover, visible the parts above described from different angles. Moreover, the support plane 205 presents a surface endowed with suction points 211 for retaining in position the plate or metallic sheet during the decoration treatment by chemical electro-marking. In fact, the lifting actuators 208 of the front screen have shelves 212, to allow the aforementioned suckers 210 to withdraw up to being in correspondence with the loading station 209 and the towing of the plate or metallic sheet in the treatment position. The metal canvas is in any case towed by the pairs of rollers 6, 7 and 8 of the passage station 170. The towing must occur with frame 204 and screen 207 raised; after the correct positioning of the plate or metallic sheet in the treatment plane 203 or even of taking of the plate or sheet by the pairs of rollers 6 in the passage electro-marking station 170, the suckers are rotated on a vertical axis, to render the suckers in background position 213 by the side of the frame 204 of the screen 207, so as to allow its lowering on the plate or sheet in position in the support plane 205.

Figure 24:
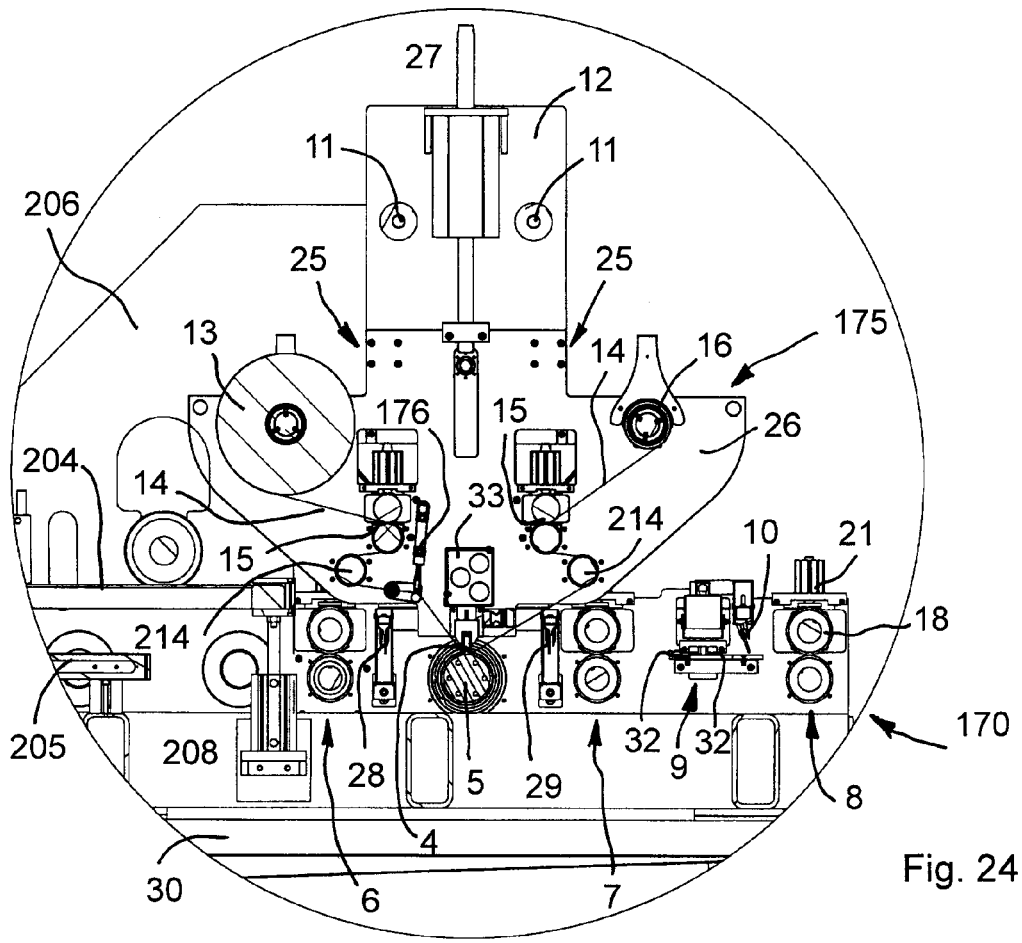
FIG. 24 represents an XXIV enlarged schematic section of FIG. 23 with the carriage placed fixed in the end of the machine for the passage decoration.

In the Figures from 20 to 24 are, moreover, visible the parts above-described by different angles. In the electro-marking mechanism 175 of FIGS. 22-23-24, similar to the mechanism 3 but endowed with actuator 176 and shunter of the felt belt 14 when the group is placed in work position in the passage electro-marking station 170. Moreover, the felt belt 14 is visible in its path in FIG. 22 from the feeding roller 13, in the first pair of straightening motor-driven rollers 15, in the guide rollers 214 of the felt belt, before and after electrode 4, and again wound in the second pair of straightening motor-driven rollers 15 up to the winding in the roller 16.

Figure 21:
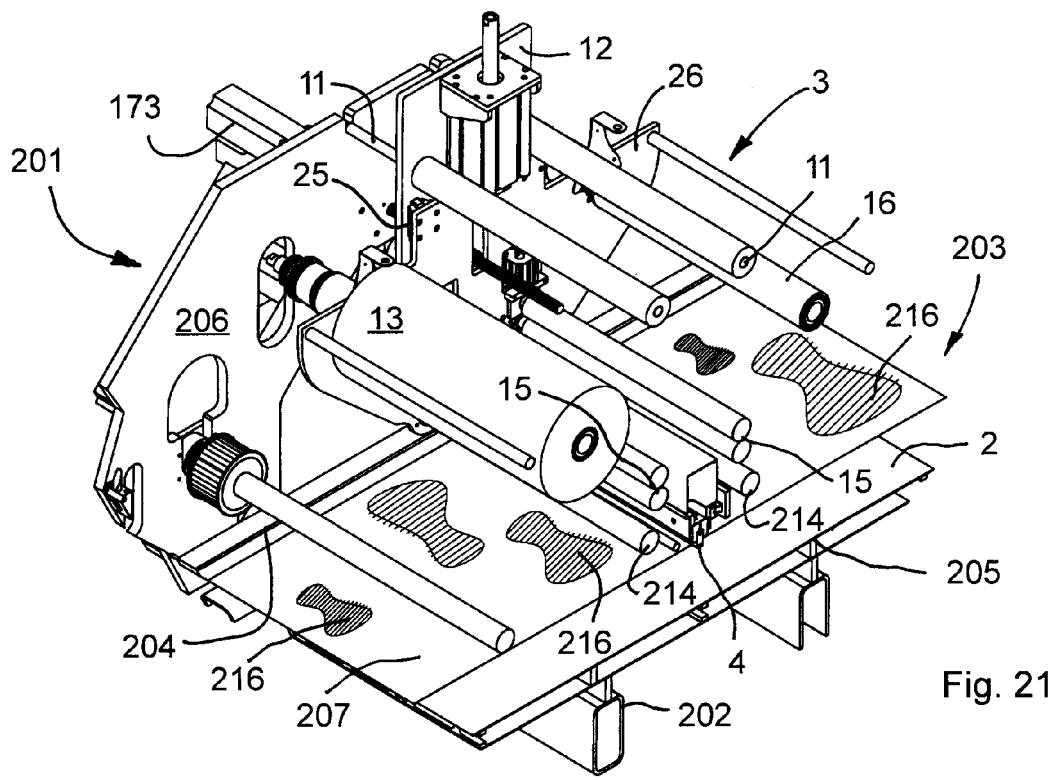
FIG. 21 represents a perspective schematic section of the carriage with the electrode, the masked screen for masking the surface of the plate, canvas or sheet in coil to be decorated.

As said the electro-marking plane 203 holds the plate or sheet to decorate in position with the frame 204 of the screen 207 because on the support base 205 by means of suction points 211, to stop the plate or sheet in the treatment. The metal canvas, instead, is maintained stopped by tensioning between the coil and the pairs of rollers 6, 7 and 8. The electro-marking treatment is carried out as represented in FIG. 21 in which the screen 207 is endowed with masking 216 and in the treatment the underlying plate 2 or metallic sheet in coil receives the expected decoration; at the end the plate 2 is made advance in the washing station 174 and the screen 207 is ready to carry out another treatment on a new plate 2 or sheet that is placed on the support plane 205 for the decoration.

Figure 25:
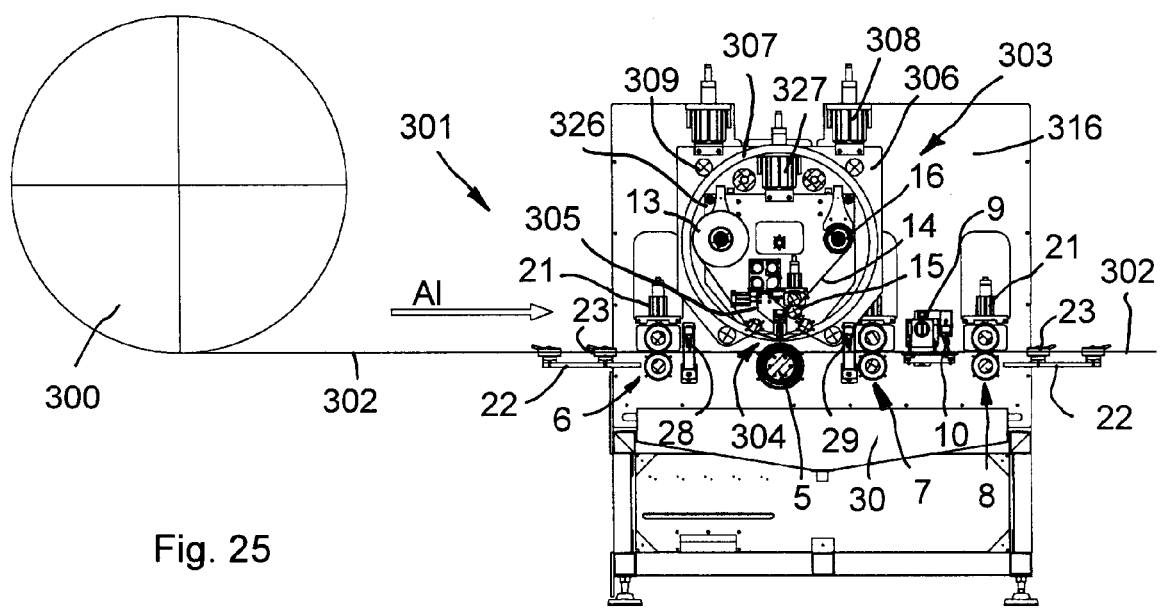
FIG. 25 represents a side schematic view of a third constructive form of the passage electro-marking machine of large plates, metal canvas or sheet in coil in which there is a drum-like screen with the decoration, in negative, present on the screen, that moves in synchronous with the plate, the canvas or the metallic sheet in coil.
Figure 26:
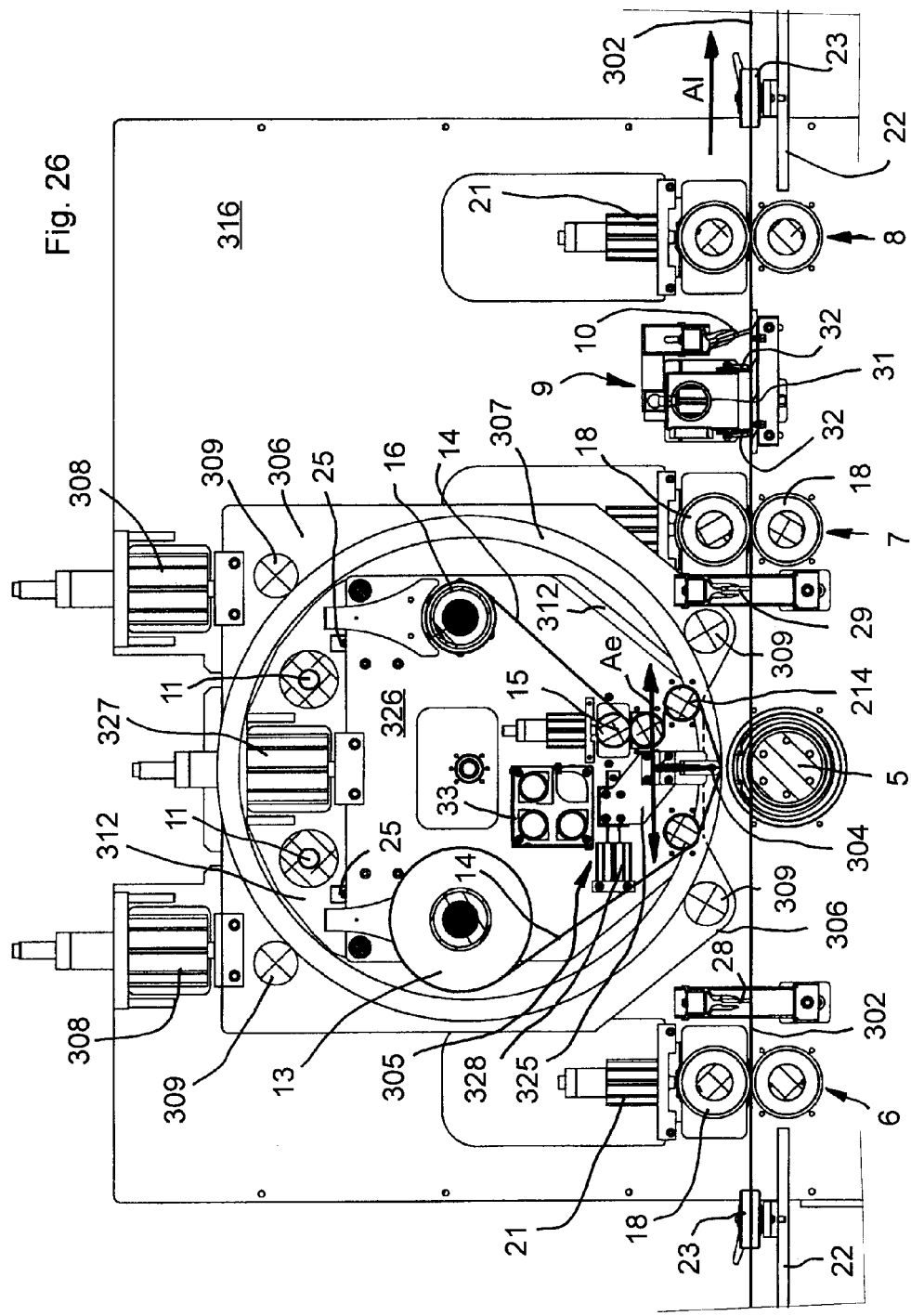
FIG. 26 represents an enlarged schematic section of FIG. 25 to show the assembly for supporting and moving the drum-like screen and the electrode with combined motion in a superficial narrow band of the plate, canvas or metallic sheet in coil.

In the FIGS. 25 and 26, finally, an electro-marking machine is visible with passage position 301 and with drum-like screen 307, here without the external shell to better enhance the internal constituents. The metallic material being worked is unwound from a coil 300 of sheet or metal canvas 302 to be treated with the decoration or the uniform mark. An electro-marking mechanism 303 with drum-like screen is endowed with oscillating electrode 304 in transverse direction, as the previous constructive forms, and, for the chemical electro-marking on the metallic sheet or canvas in coil also with longitudinal reciprocating motion Ae in the advancement direction in lines A1 of the sheet or metal canvas 302. A longitudinal oscillating mechanism 305 of the electrode, with short and obviously reciprocating motion and centred on the axis of the contrast roller 5, executes the particular electro-marking action with orbital motion of the electrode 304 within the screen 307, in the combination of the two movements on the sheet or canvas, in the electro-marking position inside the drum-like screen 307, using its flexibility. Also the electrode 304 is fed by a conductor, from the electric circuit, and electric current suitable for the electro-marking work of the plate specific metal. The other conductor, also this from the electric circuit, is connected with the contrast roller 5. The drum-like electro-marking mechanism 303 is supported by means of lateral sides 306 endowed with peripheral rotational pins 309 of the drum; the electro-marking mechanism is also made oscillating in a transverse way, to carry out the T motion of the electrode 304 on the internal surface of the drum-like screen 307 with the motion of the sides 312 of the electrode 304 moreover, between said sides 312 a pair of actuators 327 is supported to approach or space out vertically the electrode 304 from the screen 307, with respect to the lateral sides 306; moreover, the longitudinal oscillating mechanism 305 of the electrode comprising slidable side brackets 325 for connection to the electrode and reciprocating operating actuators 328 of the brackets with respect to the sides 326 of the electrode 304 and of the rollers, 13 and 16, and actuators 15 for the movement of the felt belt 14. The supporting or rotation mechanism of the drum-like screen 307 is made vertically movable by means of lifting and lowering actuator means 308 in the prearranged treatment position of the metallic sheet or metal canvas 302 to be decorated, with respect to the stationary external walls 316 of the electro-marking mechanism 303.

Figure 27:
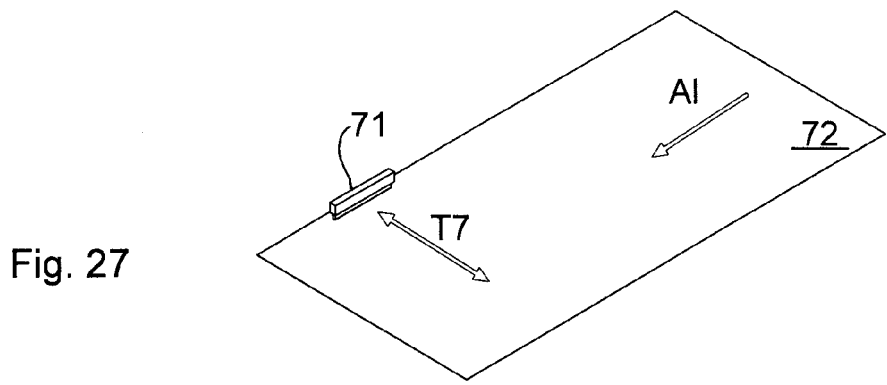
FIG. 27 represents in schematic form the movement of an electrode longitudinal to the plate and of the same plate, to activate the chemical electro-marking action, in a constructive form variation of the electro-marking machine with average production.

In the FIG. 27, as alternative constructive solution of an electro-marking machine, is represented the movement of a linear electrode 71 and oriented in the length of the plate 72 or sheet in coil. Due to a length of the electrode treatment front on the surface of the plate, this arrangement is convenient for more limited productions than the solutions of previous Figures. The movement of the electrode is carried out in transverse direction T7 with reciprocating motion and centred in the region of plate to be treated by electro-marking. The feeding motion of the plate 72 is carried out in direction A1 in parts to offer always new plate surface to the electrode 71, with transverse motion, at every part of movement. The advancement in the single movement part is much less than the length of the electrode 71, so the sheet surface is more times concerned by the passage of the electrode in the treatment.

Figure 28:
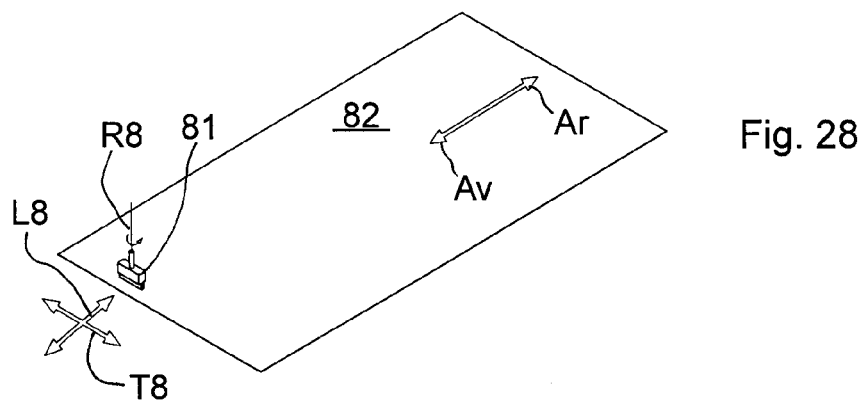
FIG. 28 represents in schematic form the movement of a rotating spatula-like shaped electrode on the plate and of the same plate, to activate the chemical electro-marking action, in a constructive form variation of the electro-marking machine with average or limited production.

In the FIG. 28 a linear electrode 81, but with rotary movement R8 on an axis of its own, is moved on the surface of the plate 82 or sheet in coil with combined motion transverse T8 and longitudinal L8 to the plate, along a transverse band of the plate surface. The plate 82 is endowed with movement in longitudinal direction Av, advancement, and Ar return. To have the complete treatment of the plate with the electro-marking, as it occurs in case of the previous Figures, the movement Av must be also just a little but greater than Ar, so by steps the plate advances until the complete treatment.

Figure 29:
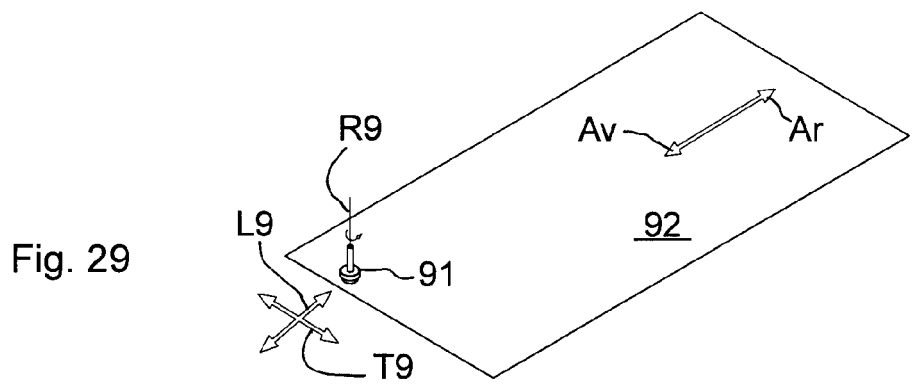
FIG. 29 represents in schematic form the movement of a rotating disk type electrode on the plate and of the same plate, to activate the chemical electro-marking action, in a constructive form variation of the electro-marking machine with average or limited production.

In the FIG. 29 a disk type electrode 91, with rotary movement R9 on an axis of its own, is moved on the surface of the plate 92 or sheet in coil with combined motion transverse T9 and longitudinal L9 to the plate, along a transverse band of the plate surface. The plate 92 is endowed with movement in longitudinal direction Av, onwards, and Ar in return. To have the complete treatment of the plate with the electro-marking, also in this case, the movement Av must be greater than Ar but minor than the diameter of the disc of the electrode 91, so by steps the plate advances until the complete surface treatment. The relative movements of the last constructive machine variations between electrode in the described various forms and the plate, metal canvas or metallic sheet in coil can be executed, only for limited productions, also by using common industrial robots opportunely programmed to carry out said movements.

The operation of the machine for decoration by electro-marking of large metallic surfaces occurs as follows. The machine shown in the Figures from 2 to 14 operates on large surfaces applying the electro-marking on the whole surface or on part of the surface of the plate or sheet in coil introduced in it. In the electro-marking the possible coloring is only in the color of its oxide, inasmuch as the color taken by the metal is subsequent to the electrochemical action of the etching solution in the same metal. The machine can be also used only to mark with uniform color the whole or part of the surface of the plate or metallic sheet or even, with the masking of the surface to be treated, to carry out a specific writing, design or ornament on the treated surface of the plate, canvas or metallic sheet. To mark in a uniform way the plate is sufficient to carry out the electro-marking treatment making pass the plate 2 or metallic sheet in coil, in the machine and at the end the surface of the metallic plate will present uniform color of its oxide, but with the characteristic that it cannot be removed if not by mechanical working with abrasion. The transverse motion T of the electrode occurs for few centimeters, compatibly with the run of the electro-marking mechanism 3 on the guides 11, but sufficient to apply in a uniform way the electro-marking for the described combined orbital motion.

The operation of the second constructive form of Figures from 15 to 24 occurs by the advancement motion A of the movable carriage 201 or the plate in treatment in the station 170 where the electro-marking mechanism 3 moves in reciprocating way T. In fact, the motion A presents two directions A1 forward, from the introduction of the metallic plate or metallic sheet in coil towards the treatment point, and A2 in opposite direction, namely for making the plate withdraw after an advancement with direction A1. As said previously the transverse motion T of the electro-marking mechanism 3 is reciprocating and centred on the centreline of the plate 2 or sheet in treatment. The total motion between the electrode 4, that is carried sideways by the motion T, and the plate 2, that is endowed with advancement motion, in direction A1, and return motion, in direction A2, an orbital positioning of the electrode is obtained, in sequence on the surface of the plate to be marked. To offer always new surface of plate, canvas or metallic sheet to treat to mechanism 3 the advancement in direction A1 must be greater than the return in direction A2, namely by successive steps the plate always advances more than how it withdraws. In this way the electro-marking action of the electrode 4 is uniform on the treated surface of the plate 2, metal canvas or sheet.

With the machine combined with screen and passage electro-marking station the decoration of plate or metallic sheet on the electro-marking plane 203 occurs after having placed the plate or metallic sheet, making it advance from the loading station 209 for taking of the suckers 210 of the movable carriage 201. The plate 2 is held in position by means of the vacuumed suction by the holes 211. The screen 207 is lowered in contact with the plate and the electrode can start the decoration in the same way of the passage station, with the difference that the advancement and return motions belong to the movable carriage 201 with the electrode 4 that performs the transverse motion T. In the motion of the movable carriage 201, the tension of the felt 14 is maintained by double motor-driven rollers 15, upstream and downstream of the electrode 4, as well as by the guide rollers 214 and by the positioning of the movable carriage in the passage electro-marking station the actuator 176 provides to detach the path of the felt belt 14 from the electro-marking mechanism.

The decoration of the surface in treatment is executed by the described machine applying to the surface to treat a masking with an ink or coating not etched by the etching solution, namely that does not allow the etching solution to carry out the electro-marking action in the region covered by the masking. It, when made with an ink set or consolidated liquid product, after the electro-marking treatment, is subjected to the removal of the masking with solvent or diluent suitable to remove the masking, made by the ink or consolidated liquid product, from the treated surface of the plate or metallic sheet. The visible ornament will appear only on the non-protected plate surface, namely that was subjected to the electro-marking treatment. Another way to carry out the masking of the plate surface or metallic sheet to be decorated can happen with the application of a protective film in which the shape of the decoration has already been made or pre-engraved. The film adheres to the surface to treat with an adhesive and consists of a material that resists to the etching action of the solution used, in such a way to prevent the oxidizing effect due to electro-marking where necessary, to define the specific required ornament. At the end of the electro-marking treatment the masking film can be removed mechanically or by physical actions to decrease the tackiness of the adhesive used. With the masking adhesive film also the application of a whole film to the surface of the plate or the metallic sheet in coil is likely to be provided. Prior to treatment with a laser or digital printing the film can be engraved or also removed in the regions of the plate surface where the treatment for the creation of the desired ornament is necessary. At the end of the electro-marking treatment the film residue can be removed like for the above described pre-engraved film. An additional way of masking the surface to be treated for the decoration can happen with an adhesive screen on the laying side on the surface to treat: during the treatment the screen protects the surface from the execution of the electro-marking; at the end of the treatment the screen can be removed remaining intact and applied on another surface to treat with the same design, writing or ornament in it operated.

The operation with the simplified electrode 58 occurs similarly to the electrode with elements 36 but is most suitable for works on complete surface and uniform electro-marking on the surface of the plate, canvas or metallic sheet in coil. The etching solution is sprayed on the felt belt 14 by the nozzles 67, while the contact between the electrode and the surface of the plate has a movement A1, advancement, and A2, return, for the whole length of the plate. Following more passages the electrode executes the total electro-marking of the plate. In performed tests the electro-marking machine carried out the treatment of a plate of 1500 mm×3000 mm using a time from 1 to 3 minutes for $m^2$ of surface. The similar total electro-marking treatment on a surface of this size, manually executed by the operator, requires about 30 minutes each $m^2$ of surface.

With the machine with drum-like screen 307, of FIGS. 25 and 26, the electro-marking station is a passage one and the decoration of metal canvas or metallic sheet occurs by the electro-marking mechanism 303. The metal canvas or sheet 302, is made advance with motion AI in steps for towing the pairs of rollers 6, 7 and 8. The advancement occurs with the continuous tension of the surface portions between the rollers, because the pairs of rollers are motor-driven each separately. The screen 307 is lowered in contact with the surface being treated with the electrode and the electrode 304 can start the decoration in the same way as the passage station, with the difference that the advancement and return motions belong to the electrode 304, for the freedom of reciprocating longitudinal motion allowed by the brackets 325 with respect to the group with the electrode 304 that performs the transverse motion T as in the other constructive forms. With the motion of the electrode 304, the tension of the felt 14 is maintained constant and with the motor-driven rollers 15, downstream of the electrode 304, as well as with the guide rollers 214 and upstream with a friction on the rotation of the feeding roller 13 of the felt belt. Once completed the decoration of a portion the advancement of the canvas or metallic sheet is carried out in synchronous between the drum-like screen 307 and the canvas or same sheet. The actuators 308 operate for the lifting of the electro-marking mechanism complete 303 of the drum-like screen 307, to leave non-treated parts of metal surface of canvas or sheet or for the starting and/or end of the electro-marking working.

The advantages, therefore, that can be enhanced in the machine for the decoration by electro-marking of large metallic surfaces according to the invention can be summarized as follows. The electro-marking can occur in a rapid, precise and uniform way either in the total electro-marking of the plate, metal canvas or metallic sheet in coil, or as said using one of the constructive machine forms described. They carry out the electro-marking motion that resulted most suitable for the marking, coloring or specific decoration of large metallic surfaces without leaving shades, scores or different tonalities in the treatment and furthermore not being light sensitive. Moreover, the electro-marking machine equipped with the movable electrode, transversely or transversely and longitudinally, with the carriage 201 or with the described double combined motion of the electrode, is advantageous either in the electro-marking with decoration, using said simplified electrode 58 and with also the electrode with sections 63 or elements of electrode 36 for limited surfaces. The constructive forms of electrode with limited size: either translating 71, or rotating electrode 81 and 91, even if unsuitable to large volumes of production, they make in small range the same combination of relative motions between electrode and metallic surface in treatment that is claimed. The resulting production volume is certainly minor than the described constructive forms, but machines manufactured with said limited size electrodes are simplified also for the fixed positioning of the felt belt on the electrode, avoiding the supporting, advancement and collection mechanism of the felt belt.

Finally, the decoration, the pattern or the writing made on large plates, metal canvas or metallic sheet in coil results precise in the definition of the ornament, fast to carry out and very economic.

Obviously, a technician skilled in the art in order to satisfy specific and incidental needs, can bring numerous changes to the above described machine or method for the decoration by electro-marking of large metallic surfaces, all moreover falling within the protection field of the present invention as defined by the following claims. Thus in the third constructive form in addition to the metallic surface 302 in coil 300 also a fair surface such as a metallic sheet with finite length similar to that of 2 of FIGS. 2-24 can be treated.

The invention claimed is:

1. A method of treatment by electrochemical marking of large metallic surfaces, comprising:
    performing a treatment in which an electrode and a buffer impregnated with etching solution is endowed movement in a longitudinal direction with rolling, with respect to the metallic surface in treatment,
    wherein the electrode is endowed with transverse motion combined with the longitudinal movement of the metallic surface itself or of the electrode with the impregnated buffer and is carried to cover the entire surface in treatment by more sliding passages;
    wherein the transverse and longitudinal movement is obtained by the combination of two motions an advancement and return first motion indifferently belonging to the electrode or to the plate, canvas or metallic sheet in coil, and a second reciprocating motion transverse to the previous one belonging to the electrode;
    wherein the two combined motions make a passage of the electrode repeated more times on the same surface part in treatment; and
    wherein the shape or pattern of the electro-marking is made with a masking applied in a successively removable way to the plate, metal canvas or metallic sheet in coil.

2. The method of treatment according to claim 1, wherein the advancement and return movement occurs with length greater in advancement that in return in such a way to cover the metal surface in treatment with an orbital motion of a same contact point of the electrode on the surface.

3. The method of treatment according to claim 2, wherein the advancement and return movement belongs to the plate, metal canvas or sheet in coil and the difference between the advancement and the return generates the feeding motion of the metallic surface in treatment in the treatment point of the surface namely in the electrode work area.

4. The method of treatment according to claim 1, wherein to carry out the necessary masking to obtain the required ornament a serigraphy screen is used endowed with masking resisting to the electrochemical action of the etching solution used, in the surface parts in which the marking electrolytic action must be prevented.

5. A machine for the electrochemical marking treatment of metallic surfaces, comprising:
    an electrode placed in sliding movement on the metallic surface to be treated;
    a buffer impregnated with etching solution for the specific metal in treatment; and
    an electric current circuit, suitable for the electro-marking treatment of said metal, with a conductor connected to the electrode and the other conductor connected to the metallic surface in treatment,
    wherein to treat large metallic surfaces on plates, metal canvas or on metallic sheet in coil, the plate, canvas or the metallic sheet is placed in an electro-marking mechanism in a reciprocally movable way with respect to the electrode, in such a way to allow the electrode the marking electrochemical action on the surface to be treated even if the electrode is of limited size with respect to said surface, the electrode being movable in the and/or with the electro-marking mechanism; the buffer being impregnated with the etching solution at regular intervals, the relative motion of the electrode on the surface being the combination of two longitudinal and transverse relative movements, the electro-marking mechanism includes on shoulders vertical guides that drive the vertical movement of sides of the mechanism and, therefore, the electrode, and the electro-marking mechanism is supported sliding transversely to the plate, metal canvas or on metallic sheet in coil on upper guides.

6. The machine for the electrochemical marking treatment of metallic surfaces according to claim 5, wherein a decoration of the surface treated is made by means of a masking, consisting of a material that is resisting to the etching action of the solution used to prevent the oxidizing effect due to electro-marking where necessary, and placed on the surface to be treated, to obtain a desired ornament with the electro-marking action only in the metal surface part non protected by the masking; said masking being removed after the treatment.

7. The machine for the electrochemical marking treatment of metallic surfaces according to claim 6, wherein the masking is made with a screen, resisting to the specific etching solution, placed in relation to the plate, canvas or metallic sheet in coil, after the treatment the screen is removed remaining intact and applied on a new surface to be treated of other plate or other portion of canvas or metallic sheet in coil.

8. The machine for the electrochemical marking treatment of metallic surfaces according to claim 5, wherein the advancement motion belongs to the plate, metal canvas or metallic sheet in coil.

9. The machine for the electrochemical marking treatment of metallic surfaces according to claim 6, wherein there is a passage electro-marking station of the plate, metal canvas or metallic sheet in coil associated to a frame structure where the metallic surface is electro-marked on a support plane by the electro-marking mechanism sliding on a movable carriage over said support plane.

10. The machine for the electrochemical marking treatment of metallic surfaces according to claim 6, wherein there is a passage electro-marking site for plate, metal canvas or metallic sheet in coil endowed, to carry out a specific electro-marking decoration, with a serigraphy screen, with masking resisting to the etching solution, drum-like shaped and placed in synchronous movement with the feeding of the plate, canvas or metallic sheet in coil.

11. The machine for the electrochemical marking treatment of metallic surfaces according to claim 10, wherein the movable electrode inside the drum-like screen is endowed with transverse motion and longitudinal motion around the tangent parallel to the axis of the contrast roller underlying the movable electrode.

12. The machine for the electrochemical marking treatment according to claim 5, wherein the electro-marking mechanism includes a roller of support and contrast (5) to the electrode (4, 304), roller cooled by means of internal holes with a cooling liquid, and pairs of dragging rollers (6, 7 and 8) for the motion of the metal surface in treatment, so the plate, the metal canvas or the metallic sheet can advance and withdraw (A2, Ar) even more times in the position of the electrode.

13. The machine for the electrochemical marking treatment according to claim 5, wherein the electrode is made in a single element to cover the complete width of the plate, metal canvas or metallic sheet in coil, being endowed with internal path for a cooling liquid.

14. The machine for the electrochemical marking treatment according to claim 5, wherein the electrode is subdivided in elements or sections fed separately from the etching solution, by the electric current conductors and by specific pipes for the connection to a circuit with cooling liquid of internal channels to the single element.

15. The machine for the electrochemical marking treatment according to claim 5, wherein the buffer is made with a belt in felt, having complete width of the electrode, and interposed between it and the metallic surface in treatment, and the electro-marking mechanism includes a movement mechanism of the felt belt in which there is a feeding roller of the felt belt, at least one pair of motor-driven rollers for dragging the felt downstream of the electrode, at least one belt tension means upstream of the electrode, as well as a winding roller of the felt belt used.

* * * * *